United States Patent
Nakamura et al.

(10) Patent No.: US 7,590,995 B2
(45) Date of Patent: Sep. 15, 2009

(54) EPG DISPLAY APPARATUS, EPG DISPLAY METHOD, MEDIUM, AND PROGRAM

(75) Inventors: Masakazu Nakamura, Ibaraki (JP); Hiroshi Yasuno, Sijounawate (JP)

(73) Assignee: Panasonic Corporation, Osaka (JP)

( * ) Notice: Subject to any disclaimer, the term of this patent is extended or adjusted under 35 U.S.C. 154(b) by 1523 days.

(21) Appl. No.: 10/275,502

(22) PCT Filed: Mar. 4, 2002

(86) PCT No.: PCT/JP02/01941

§ 371 (c)(1), (2), (4) Date: Apr. 17, 2003

(87) PCT Pub. No.: WO02/071743

PCT Pub. Date: Sep. 12, 2002

(65) Prior Publication Data

US 2003/0167466 A1 Sep. 4, 2003

(30) Foreign Application Priority Data

Mar. 5, 2001 (JP) .............................. 2001-060836

(51) Int. Cl.
G06F 3/00 (2006.01)
G06F 13/00 (2006.01)
H04N 5/445 (2006.01)

(52) U.S. Cl. ............................... 725/52; 725/44; 725/61

(58) Field of Classification Search .................... 725/44, 725/45, 47, 52, 53, 61, 46; 345/419, 420; 715/848–852

See application file for complete search history.

(56) References Cited

U.S. PATENT DOCUMENTS

| 4,462,030 | A | | 7/1984 | Ishii | |
|---|---|---|---|---|---|
| 5,485,197 | A | * | 1/1996 | Hoarty | ........................ 725/37 |
| 5,678,015 | A | * | 10/1997 | Goh | ........................... 715/782 |
| 6,005,601 | A | * | 12/1999 | Ohkura et al. | ................. 725/52 |

(Continued)

FOREIGN PATENT DOCUMENTS

EP 0626635 11/1994

(Continued)

OTHER PUBLICATIONS

Chinese Official Action, mailed Nov. 5, 2004 with partial English translation.

(Continued)

*Primary Examiner*—Christopher Kelley
*Assistant Examiner*—Michael Van Handel
(74) *Attorney, Agent, or Firm*—RatnerPrestia

(57) ABSTRACT

In the case when EPG data of multiple channels is displayed on a display, if the data is attempted to be downsized uniformly and displayed, information of each displayed program is displayed smaller. Hence, such information becomes very difficult for humans to see.

The present invention provides an EPG display apparatus comprising second storage means of storing three-dimensional EPG data obtained by mapping all or part of two-dimensional EPG data on the side face of a cylinder in a three-dimensional space, and control means of displaying all or part of the three-dimensional EPG data stored in the second storage means on a display having a two-dimensional screen.

9 Claims, 20 Drawing Sheets

U.S. PATENT DOCUMENTS

| | | | | |
|---|---|---|---|---|
| 6,094,237 | A * | 7/2000 | Hashimoto | 348/731 |
| 6,184,884 | B1 * | 2/2001 | Nagahara et al. | 715/828 |
| 6,344,861 | B1 * | 2/2002 | Naughton et al. | 715/769 |
| 6,411,337 | B2 * | 6/2002 | Cove et al. | 348/563 |
| 6,505,194 | B1 * | 1/2003 | Nikolovska et al. | 707/3 |
| 6,636,246 | B1 * | 10/2003 | Gallo et al. | 715/805 |
| 6,754,906 | B1 * | 6/2004 | Finseth et al. | 725/45 |
| 6,857,128 | B1 * | 2/2005 | Borden et al. | 725/39 |
| 7,134,095 | B1 * | 11/2006 | Smith et al. | 715/860 |
| 7,312,796 | B1 * | 12/2007 | Kikinis | 345/420 |

FOREIGN PATENT DOCUMENTS

| | | |
|---|---|---|
| EP | 0767418 | 4/1997 |
| EP | 921689 | 6/1999 |
| JP | 57-101996 | 6/1982 |
| JP | 04-214595 | 8/1992 |
| JP | 07-114451 | 5/1995 |
| JP | 09-307827 | 11/1997 |
| JP | 10-093880 | 4/1998 |
| JP | 11-098431 | 4/1999 |
| JP | 11-146299 | 5/1999 |
| JP | 11-168666 | 6/1999 |
| JP | 2000-69380 | 3/2000 |
| JP | 2000-278639 A | 10/2000 |
| JP | 2000-287179 | 10/2000 |
| JP | 2003-529156 | 9/2003 |
| WO | WO 99/57890 | 11/1999 |
| WO | WO 00/39662 | 6/2000 |
| WO | WO 01/73598 | 10/2001 |

OTHER PUBLICATIONS

Nikkei Byte, "Competition for the Top of Home-use Information Devices Has Begun", Nikkei Business Publications, Inc., Sep. 1, 1995, No. 142, pp. 134-154, Japan (with partial English translation).

Supplementary European Search Report, corresponding to International Application No. PCT/JP02/01941, dated Sep. 28, 2005.

Japanese International Search Report for PCT/JP02/01941, dated Jul. 2, 2002.

English translation of Japanese International Search Report for PCT/JP02/01941, dated Jul. 2, 2002.

* cited by examiner

Fig. 8 (a)

| CH 131 | Q1 | Q2 | Q3 | Q4 | Q5 | Q6 |

Fig. 8 (b)

| CH 131 | Q1 | Q2 | Q3 | Q4 | Q5 | Q6 |

EPG DISPLAY APPARATUS, EPG DISPLAY METHOD, MEDIUM, AND PROGRAM

THIS APPLICATION IS A U.S. NATIONAL PHASE APPLICATION OF PCT INTERNATIONAL APPLICATION PCT/JP02/01941.

TECHNICAL FIELD

The present invention relates to an EPG display apparatus, an EPG display method, a medium and a program used to display EPG data.

BACKGROUND TECHNOLOGY

Conventionally, TV program broadcast schedules have been known to the audience by newspapers, magazines, etc; in recent years, as a substitute of newspapers, magazines, etc., an EPG (electronic program guide) has been proposed and made practical. Such an EPG, transmitted from TV broadcast stations and the like, is data of TV program broadcast schedules similar to those described in newspapers, magazines, etc., wherein a broadcast schedule date, a broadcast time, a channel, a program name, etc. are described for each program.

This kind of EPG is used when TV programs are scheduled to be recorded or watched; for example, when displayed on a TV CRT and the like, the EPG is displayed so as to be seen flat by humans, just like the descriptions in newspapers and the like.

When the number of TV channels increases, the amount of EPG data also increases; however, in the case when EPG data of multiple channels is displayed on a display, if such data is attempted to be downsized uniformly and displayed, the information area of each displayed program becomes small. Hence, the EPG becomes very difficult for humans to see.

DISCLOSURE OF THE INVENTION

Accordingly, in consideration of the problem of the above-mentioned conventional example, the present invention is intended to provide an EPG display apparatus, an EPG display method, a medium and a program capable of displaying EPG data easier to see in comparison with the conventional example, even when the number of channels increases.

One aspect of the present invention is an EPG display apparatus comprising:

storage means of storing three-dimensional EPG data obtained by mapping all or part of two-dimensional EPG data on a surface of an object having a predetermined shape in a virtual three-dimensional space, and control means of displaying all or part of said three-dimensional EPG data stored in said storage means on a two-dimensional screen, wherein the surface of said object includes a visually recognizable front face and a rear face covered by said front face, and when said EPG data is displayed by said control means by using the shape of said object, clearance regions are included beforehand in said EPG data to be displayed at least at the position corresponding to said front face so that at least part of said EPG data to be displayed at a position corresponding to said rear face is visually recognizable.

Another aspect of the present invention is an EPG display apparatus, wherein the shape of said object is a cylinder, a sphere or a polygonal prism.

Still another aspect of the present invention is an EPG display apparatus, wherein said control means reverses said EPG data to be displayed at the position corresponding to said rear face and then displays said EPG data.

Yet still another aspect of the present invention is an EPG display apparatus, wherein said clearance region is provided between adjacent channel data of said two-dimensional EPG data.

Still yet another aspect of the present invention is an EPG display apparatus, further comprising:

replacement display instruction accepting means of accepting an instruction for replacing a display position of said EPG data to be displayed on the front face of said object with a display position of said EPG data to be displayed on the rear face of said object and displaying said data, wherein said control means replaces the display position of said EPG data to be displayed on the front face of said object with the display position of said EPG data to be displayed on the rear face of said object and displays said data on the basis of said instruction accepted by said replacement display instruction accepting means.

A further aspect of the present invention is an EPG display apparatus, further comprising:

specific channel registration means of accepting registration for displaying the EPG data of only specific channels, and specific channel display instruction accepting means of accepting an instruction for displaying the EPG data of only said specific channels registered in said specific channel registration means, wherein the EPG data of only said specific channels corresponds to part of said two-dimensional EPG data.

A still further aspect of the present invention is an EPG display apparatus, wherein all of said two-dimensional EPG data and part of said two-dimensional EPG data are displayed on the same screen.

A yet further aspect of the present invention is an EPG display apparatus, further comprising:

acquisition means of acquiring information on recorded programs, information on programs scheduled to be recorded or information on programs scheduled to be watched, wherein said control means displays only the EPG data of programs regarding said information acquired by said acquisition means.

A still yet further aspect of the present invention is an EPG display method comprising:

a storage step of storing three-dimensional EPG data obtained by mapping all or part of two-dimensional EPG data on a surface of an object having a predetermined shape in a virtual three-dimensional space, and a control step of displaying all or part of said three-dimensional EPG data stored at said storage step on a two-dimensional screen, wherein the surface of said object includes a visually recognizable front face and a rear face covered by said front face, and when said EPG data is displayed at said control step by using the shape of said object, clearance regions are included beforehand in said EPG data to be displayed at least at the position corresponding to said front face so that at least part of said EPG data to be displayed at a position corresponding to said rear face is visually recognizable.

An additional aspect of the present invention is a program of causing a computer to function all or part of said storage means and said control means of said EPG display apparatus.

A still additional aspect of the present invention is a program of causing a computer to carry out all or part of said storage step and said control step of said EPG display method.

BRIEF DESCRIPTION OF DRAWINGS

FIG. 8(a) is a view explaining a display method (no reversing) when three-dimensional EPG data stuck to the rear face 12 of the cylinder 9 is displayed on a two-dimensional screen without being reversed in accordance with Embodiment 1 of the present invention;

FIG. 8(b) is a view explaining a display method when three-dimensional EPG data stuck to the rear face 12 of the cylinder 9 is reversed and displayed on a two-dimensional screen in accordance with Embodiment 1 of the present invention;

Explanation of Reference Codes

Figure 1:
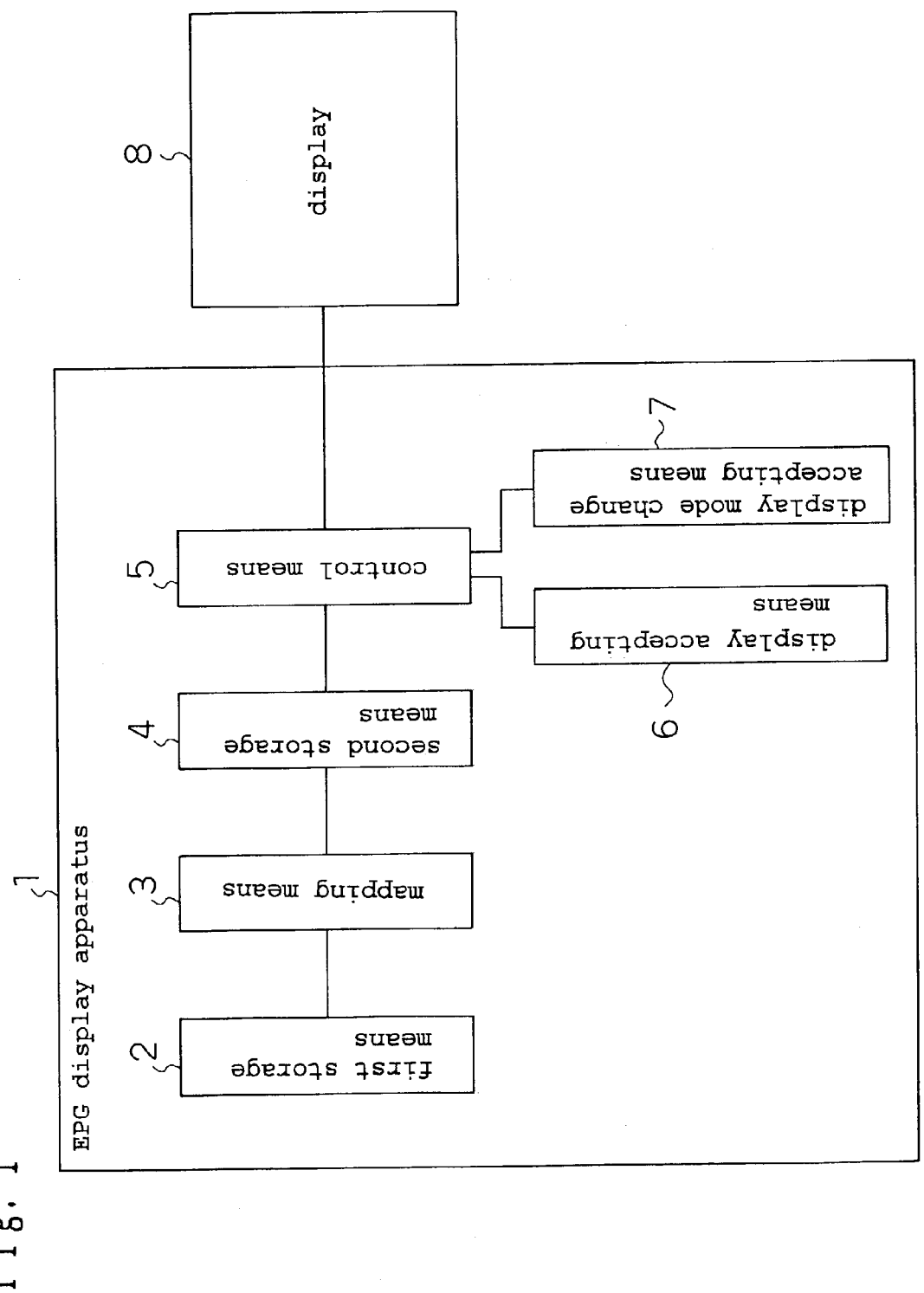
FIG. 1 is a view showing the configuration of an EPG display apparatus in accordance with Embodiment 1 of the present invention.

| | |
|---|---|
| 1 | EPG display apparatus |
| 2 | first storage means |
| 3 | mapping means |
| 4 | second storage means |
| 5 | control means |
| 6 | display accepting means |
| 7 | display mode change accepting means |
| 8 | display |
| 9 | cylinder |
| 10 | virtual screen |
| 11 | front face |
| 12 | rear face |

THE BEST MODE FOR CARRYING OUT THE INVENTION

Embodiments of the present invention will be described below referring to the drawings.

Embodiment 1

First, the configuration of an EPG display apparatus in accordance with an embodiment of the present invention will be described by using FIG. 1.

FIG. 1 shows the configuration of an EPG display apparatus 1 in accordance with Embodiment 1. As shown in FIG. 1, the EPG display apparatus 1 in accordance with Embodiment 1 comprises a first storage means 2, a mapping means 3, a second storage means 4, a control means 5, a display accepting means 6 and a display mode change accepting means 7. FIG. 1 also shows a display 8.

Figure 2:
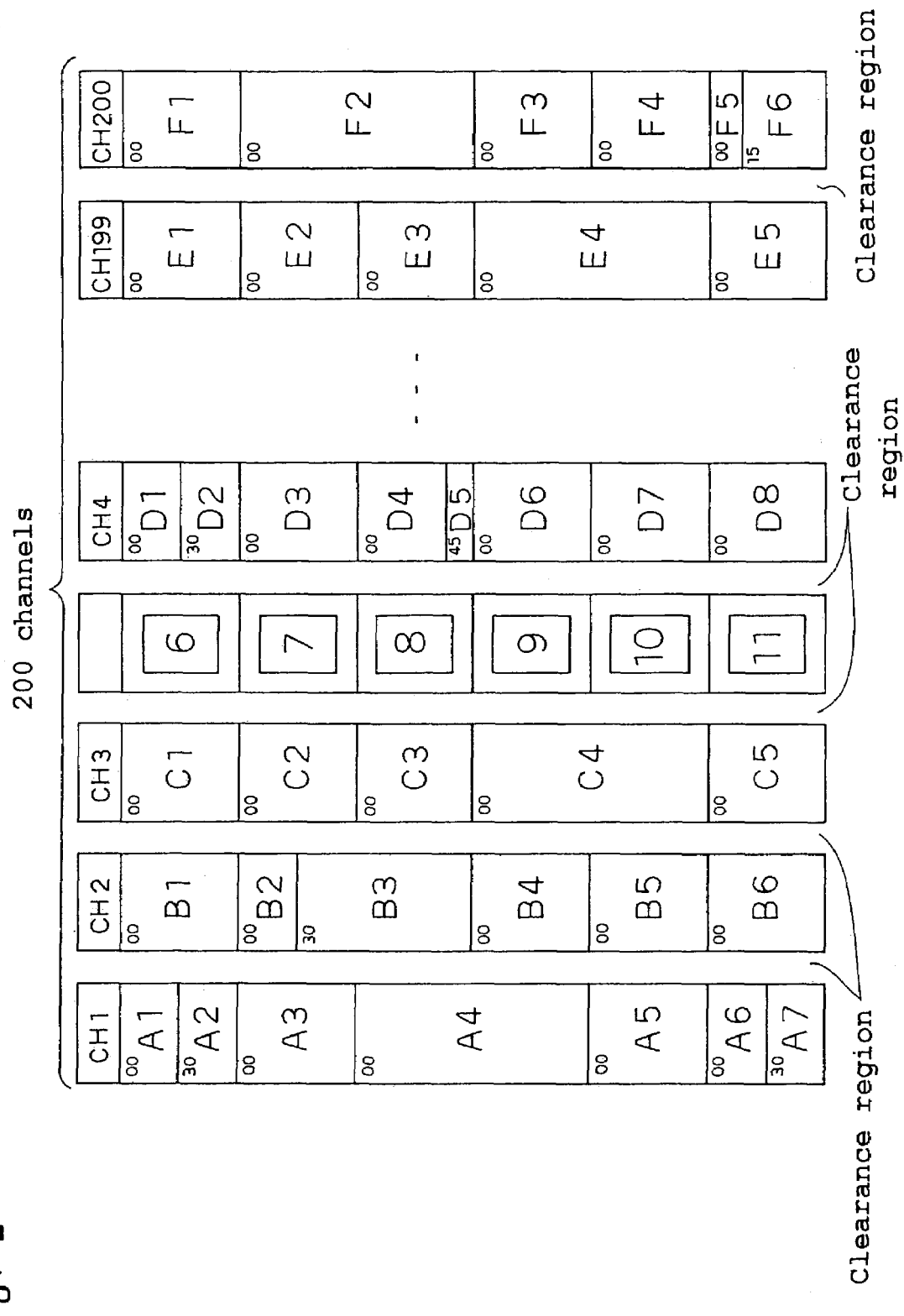
FIG. 2 is a view showing the configuration of two-dimensional EPG data.

The first storage means 2 is means of storing two-dimensional EPG data. FIG. 2 shows two-dimensional EPG data. As shown in FIG. 2, two-dimensional EPG data in accordance with Embodiment 1 is data wherein EPGs (electronic program guides) of a plurality of channels are arranged two-dimensionally, just as the TV program columns in newspapers.

For convenience in explanation, it is assumed that EPG data of 200 channels is handled in Embodiment 1.

In addition, it is also assumed that a clearance region is provided between the adjacent channel data of the two-dimensional EPG data as shown in FIG. 2.

The mapping means 3 is means of virtually mapping the two-dimensional EPG data stored in the first storage means 2 on the side face of a cylinder in a virtual three-dimensional space. "Mapping the two-dimensional EPG data on the side face of a cylinder in a virtual three-dimensional space" means that pieces of data constituting the two-dimensional EPG data, that is, A1, A2, ..., F5 and F6, are stuck to the side face of the cylinder in a virtual three-dimensional space.

The second storage means 4 is means of storing the three-dimensional EPG data processed by the mapping means 3. The control means 5 is means of displaying the three-dimensional EPG data stored in the second storage means 4 on the display 8 having a two-dimensional screen.

In addition, the display accepting means 6 is means of accepting an instruction for displaying EPG data on the display 8 from the user of the EPG display apparatus 1. The display mode change accepting means 7 is means of accepting an instruction for changing the display mode of the EPG data displayed on the display 8 from the user.

In Embodiment 1, the second storage means 4 of the EPG display apparatus of the present invention is used as an example of storage means, and the control means 5 thereof is used as an example of control means.

Next, an embodiment of an EPG display method of the present invention will be described while explaining the operation of the EPG display apparatus 1 in accordance with Embodiment 1 at the same time.

Figure 3:
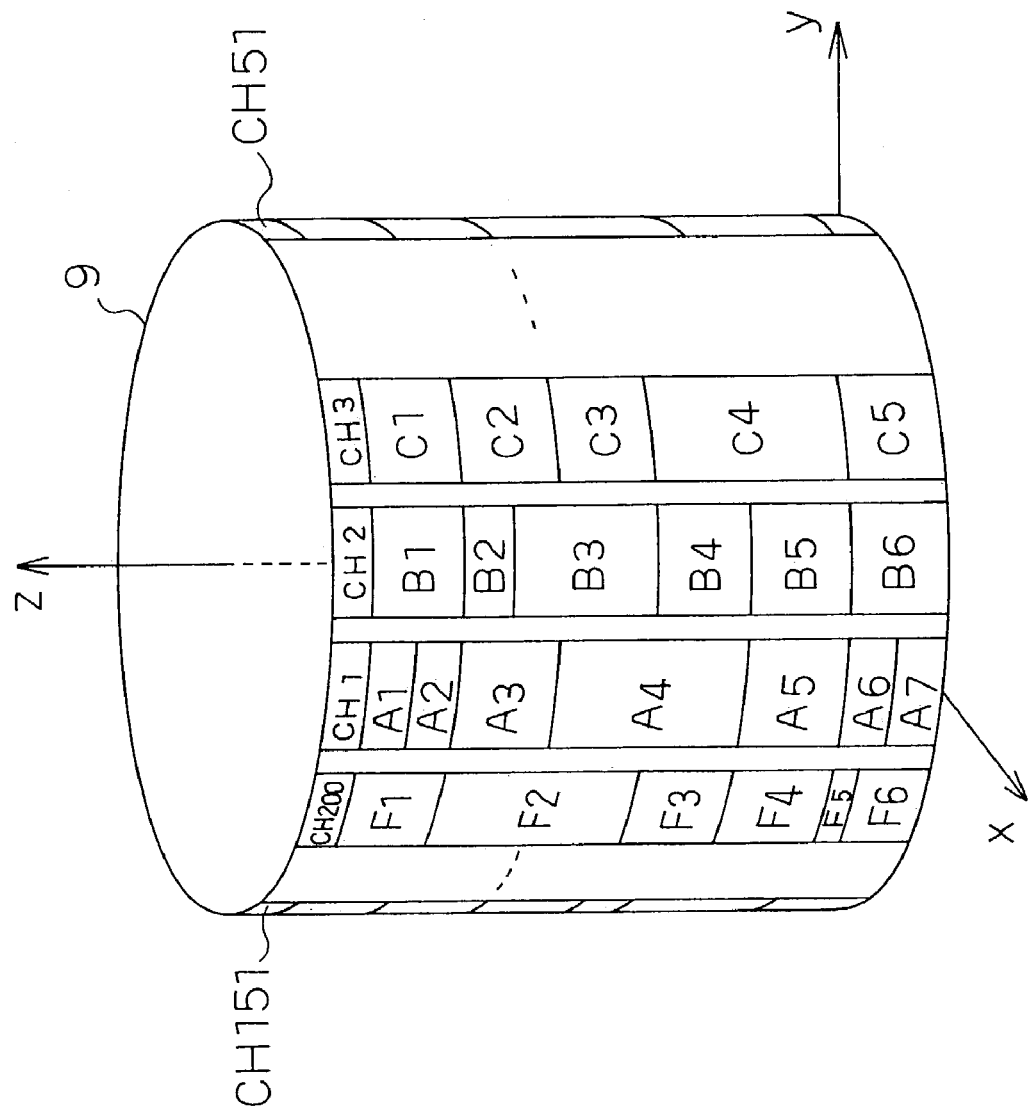
FIG. 3 is an explanatory view showing operation carried out by the mapping means 3 of the EPG display apparatus 1 in accordance with Embodiment 1 of the present invention.

First, the mapping means 3 maps the two-dimensional EPG data stored in the first storage means 2 and shown in FIG. 2 on the side face of a cylinder 9 in a three-dimensional space as shown in FIG. 3.

FIG. 3 shows three-dimensional EPG data obtained after the EPG data is mapped on the side face of the cylinder 9.

For simplicity in explanation, it is assumed in accordance with Embodiment 1 that the thickness of the outer circumferential wall of the cylinder 9 is zero and that the cylinder 9 is a colorless transparent virtual object.

For convenience in explanation, it is assumed that the z-axis of the x-y-z three-dimensional space coincides with the axis of the cylinder 9 and that the bottom face of the cylinder 9 is in the x-y plane.

Furthermore, the EPG data of a first channel is stuck to the side face of the cylinder 9 in the z-axis direction when y is zero and x is positive. Moreover, the EPG data of a second channel and the EPG data of a 200th channel, both disposed adjacent to the two-dimensional EPG data of the first channel shown in FIG. 2, are stuck to the positions on both adjacent sides of the EPG data of the first channel.

As described above, the mapping means 3 arranges the two-dimensional EPG data of each channel shown in FIG. 2 in the order of time in the z-axis direction and sticks the EPG data of all the 200 channels in the order of channel number around the circumference of the side face of the cylinder 9. The second storage means 4 then stores the mapped three-dimensional EPG data.

When the display accepting means 6 accepts an instruction for displaying EPG data on the display 8 from the user, the control means 5 displays the three-dimensional EPG data stored in the second storage means 4 on the display 8 having a two-dimensional screen in accordance with the instruction. Next, the display will be described while taking concrete examples.

Figure 4:
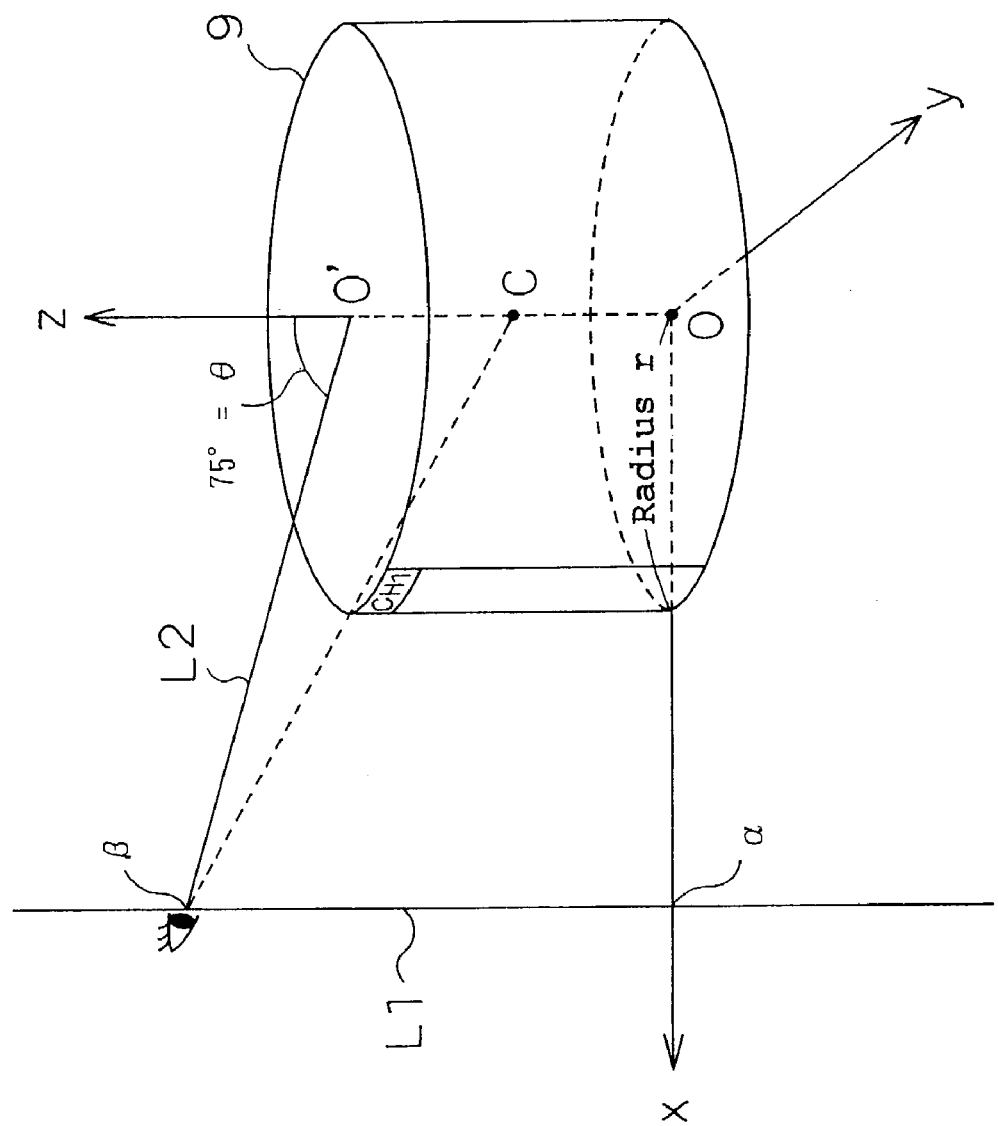
FIG. 4 is a first explanatory view explaining a method of displaying three-dimensional EPG data on a two-dimensional screen in accordance with Embodiment 1 of the present invention.

For example, as shown in FIG. 4, a point β, positioned on a straight line L1 that includes a point α disposed on the x-axis in the x-y-z space away from the origin O by a distance 2r, that is, the double of the radius r of the bottom face of the cylinder 9, and that is parallel with the z-axis, is considered. Herein, the point positioned at a place wherein a straight line L2 connecting the point O' at x=0 and y=0 on the upper face of the cylinder 9 to the point β and the z-axis form an angle of 75 degrees is assumed to be the point β.

Next, a state is considered wherein the EPG data stuck to the side face of the cylinder 9 is seen when the center C of the cylinder 9 is viewed from the point β.

Figure 5:
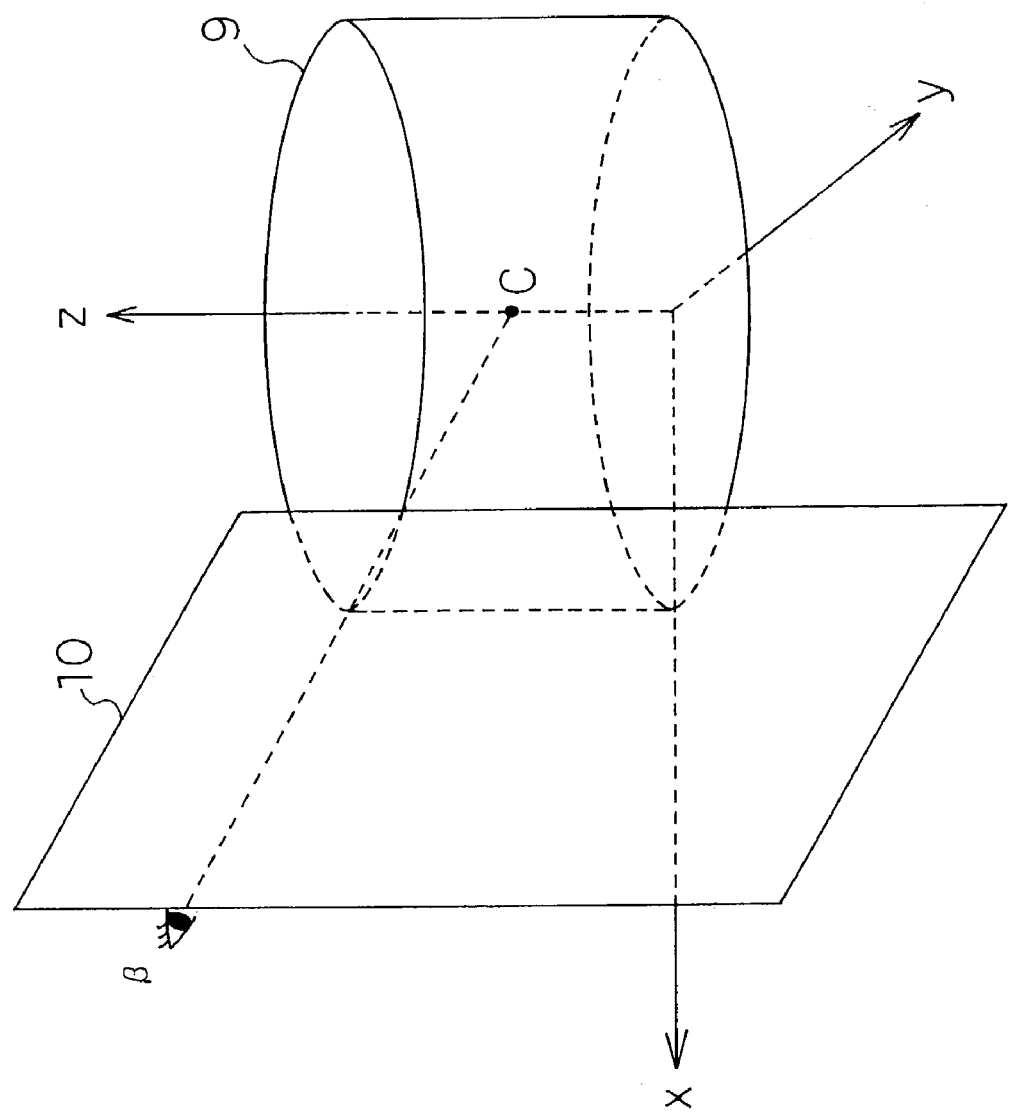
FIG. 5 is a second explanatory view explaining a method of displaying three-dimensional EPG data on a two-dimensional screen in accordance with Embodiment 1 of the present invention.

When the center C of the cylinder 9 is viewed from the point β, the EPG data stuck to the side face of the cylinder 9 is seen as if each point of the cylinder 9 is projected on a virtual screen 10 that is parallel with the y-z plane of FIG. 5, on the side of the point β.

On the display 8 having a two-dimensional screen, the control means 5 displays each point of the cylinder 9 projected on the virtual screen 10. Hence, the three-dimensional EPG data is displayed as if the data is stuck to the outer circumferential side face of the cylinder, without providing any sense of strangeness for humans.

Figure 6:
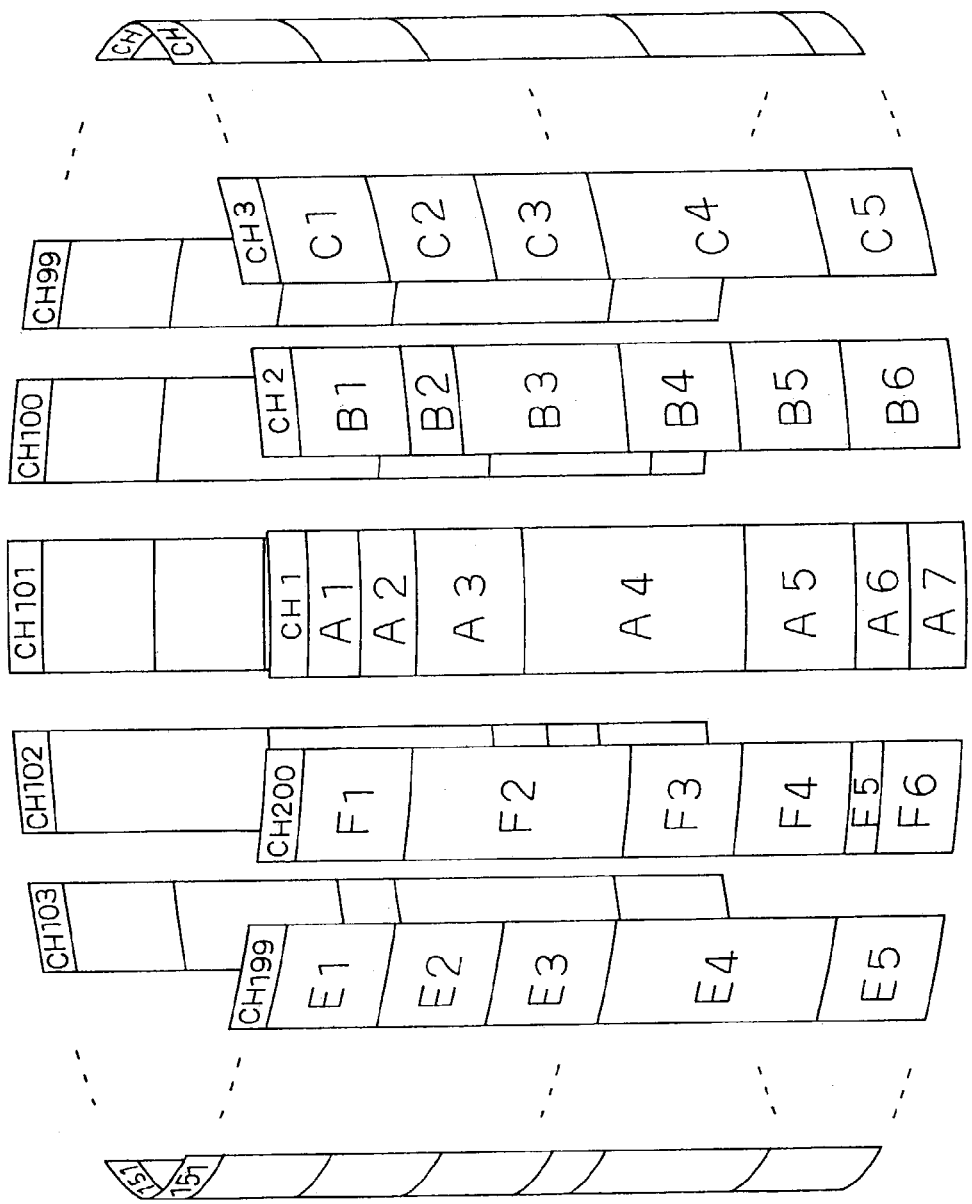
FIG. 6 is a view showing an example of EPG data displayed on a display 8 in accordance with Embodiment 1 of the present invention.

FIG. 6 shows an example of EPG data that is displayed on the display 8. As described later, FIG. 6 shows an example wherein the display method shown in FIG. 8(b) is applied.

Figure 7:
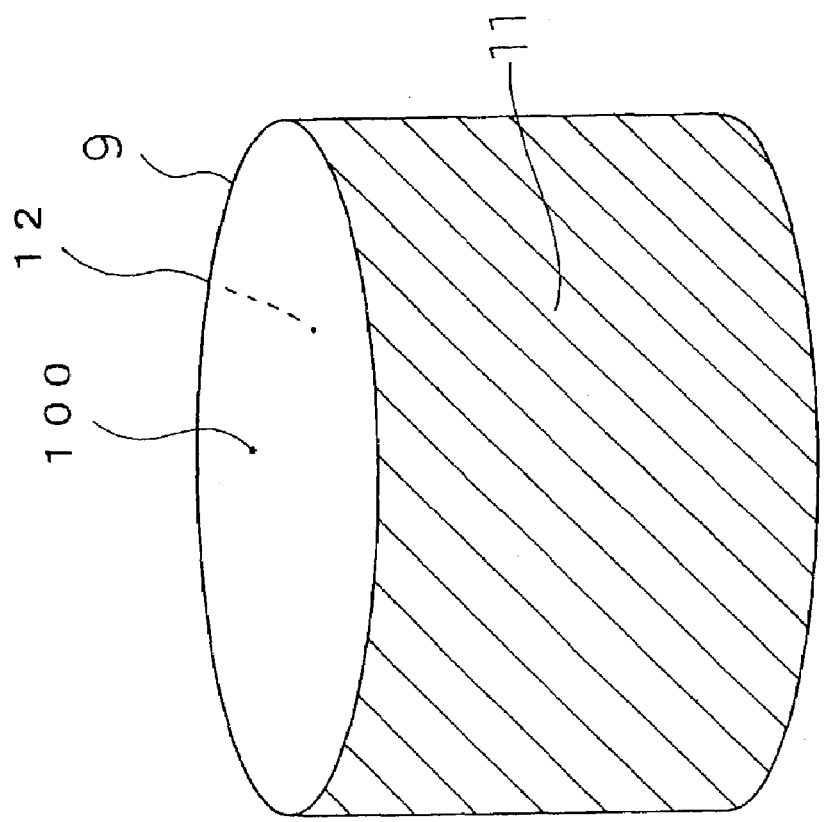
FIG. 7 is a view showing the front face 11 and the rear face 12 of a cylinder 9 in accordance with Embodiment 1 of the present invention.

As shown in FIG. 7, the cylinder 9 has a front face 11 that is visually recognizable (in other words, the outer circumferential side face on the front side as viewed from the user) and a rear face 12 (in other words, the outer circumferential side face on the rear side as viewed from the user) covered with the front face 11.

As described above, the outer circumferential side face of the cylinder 9 is transparent. Hence, the display contents on the outer circumferential side face of the rear face 12 not covered with the front face 11 can be recognized visually via the transparent wall even from the inner circumferential side face 100 of the cylinder 9.

Furthermore, in this embodiment, as shown in FIG. 2, a clearance region not displaying anything is provided between the adjacent channel data of two-dimensional EPG data. Hence, as shown in FIG. 6, even the EPG data stuck to the rear face 12 of the cylinder 9 is displayed on the display 8 so that part thereof can be seen through the clearance region.

However, when the EPG data stuck to the rear face 12 of the cylinder 9 is displayed on the two-dimensional screen of the display 8, if the EPG data is unchanged from the state of data stuck to the outer circumferential side face 12 of the cylinder 9 without properly reversing the display as described later, the data becomes difficult for humans to see.

For example, when the EPG data of a 131th channel is stuck to the rear face 12 of the cylinder 9, the user sees the EPG data from the inner circumferential face side of the cylinder 9. Hence, since characters are seen in reverse as shown in FIG. 8(a), they become difficult to see. In FIG. 8(a), for convenience in explanation, the existence of the EPG data stuck to the front face 11 is ignored.

Hence, the control means 5 reverses the EPG data stuck to the rear face 12 of the cylinder 9 and displays the data on the display 8. For example, the EPG data of the 131th channel is not seen as shown in FIG. 8(a) but eventually seen normally (see FIG. 8 (b)) when viewed from the user.

Thus, when the EPG data stuck to the rear face 12 of the cylinder 9 is displayed on the display 8, only part of the data may be able to be seen; however, the part of the data that can be seen does not provide any sense of strangeness for humans.

The control means 5 has data holding means (not shown) of temporarily holding the above-mentioned reversed EPG data.

However, as shown in FIG. 6, when the center C of the cylinder 9 is viewed from the point β of FIG. 4, the EPG data of approximately half of the 200 channels, stuck to the side face of the cylinder 9, is displayed completely; however, the remaining half is not displayed completely but partially hidden. In other words, in the example of FIG. 6, the EPG data from part of the 51th channel shown at the right corner as viewed from the user to part of the 151th channel is not displayed completely.

Hence, it is assumed that the user desires to display the three-dimensional EPG data stored in the second storage means 4 on the display 8, with the EPG data of the 51th channel placed at the center. In addition, it is assumed that the user inputs an instruction for displaying EPG data on the display 8, with the EPG data of the 51th channel placed at the center, in the display mode change accepting means 7.

The control means 5 then displays the three-dimensional EPG data stored in the second storage means 4 on the display 8 having a two-dimensional screen so that the EPG data of the 51th channel is displayed at the center of the display 8.

Figure 9:
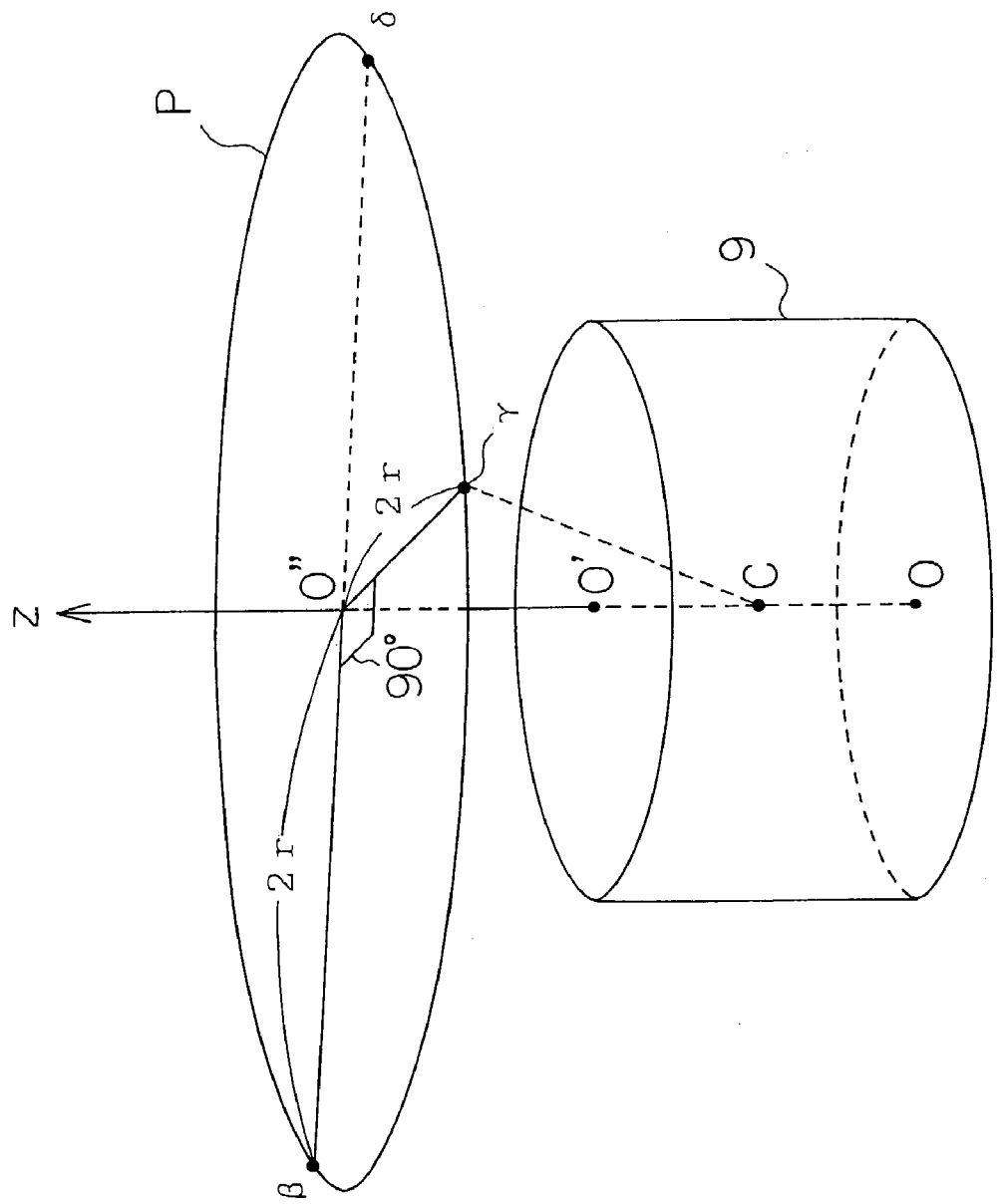
FIG. 9 is a view explaining the change of the display form of the EPG data displayed on the display 8 in accordance with Embodiment 1 of the present invention.

The display method will be described by using FIG. 9. In FIG. 9, it is assumed that the plane being parallel with the x-y plane and including the point β shown in FIG. 4 is a plane P and that the intersection of the plane P and the z-axis is a point O". As a result, the distance between the point O" and the point β becomes $2r$.

Next, it is assumed that the point placed on the plane P and having the distance $2r$ from the point O", wherein all the EPG data of the 51th channel stuck to the side face of the cylinder 9 can be seen, is a point γ. Herein, as shown in FIG. 9, the point γ is defined so that the angle formed by a line segment O" γ and a line segment O" β becomes 90 degrees.

Figure 10:
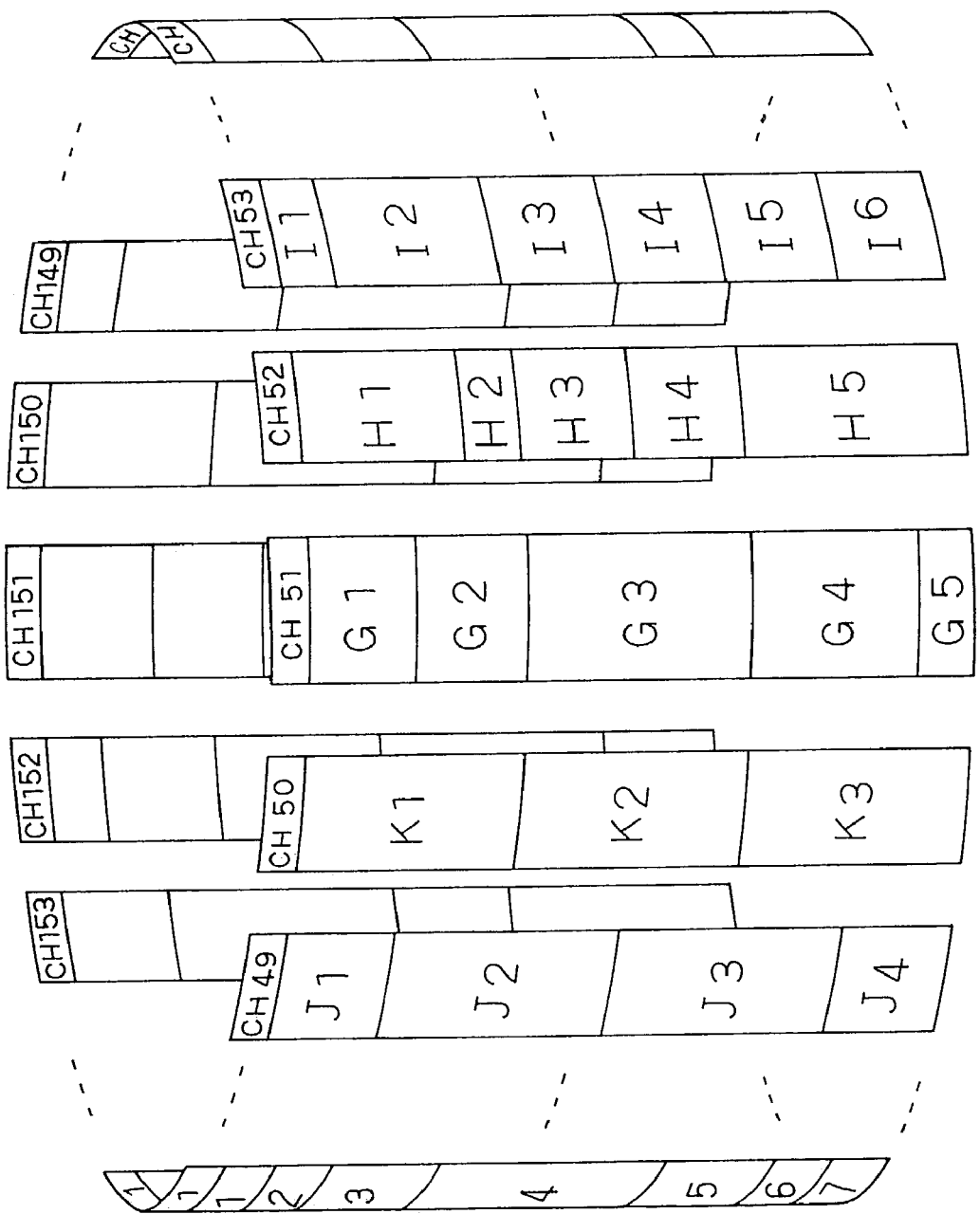
FIG. 10 is a view showing an example of EPG data displayed on the display 8 in accordance with Embodiment 1 of the present invention.

Then, just as the state wherein the EPG data stuck to the side face of the cylinder 9 can be seen when the center C of the cylinder 9 is viewed from the point β is considered by using FIG. 4 and FIG. 5, a state wherein the EPG data stuck to the side face of the cylinder 9 can be seen when the point of view is shifted from the point β to the point γ and when the center C of the cylinder 9 is viewed from the point γ is considered. The control means 5 displays the state on the display 9. As a result, the EPG data is displayed on the display 8 as shown in FIG. 10.

Next, it is assumed that the user desires to display the three-dimensional EPG data stored in the second storage means 4 on the display 8, with the EPG data of the 101th channel placed at the center.

In other words, it is assumed that the user desires to display the three-dimensional EPG data on the display 8 by replacing the EPG data stuck to the front face 11 of the cylinder 9 shown in FIG. 7 with the EPG data stuck to the rear face 12 thereof. At this time, it is assumed that the user inputs an instruction for displaying EPG data on the display 8, with the EPG data of the 101th channel placed at the center, in the display mode change accepting means 7.

Figure 11:
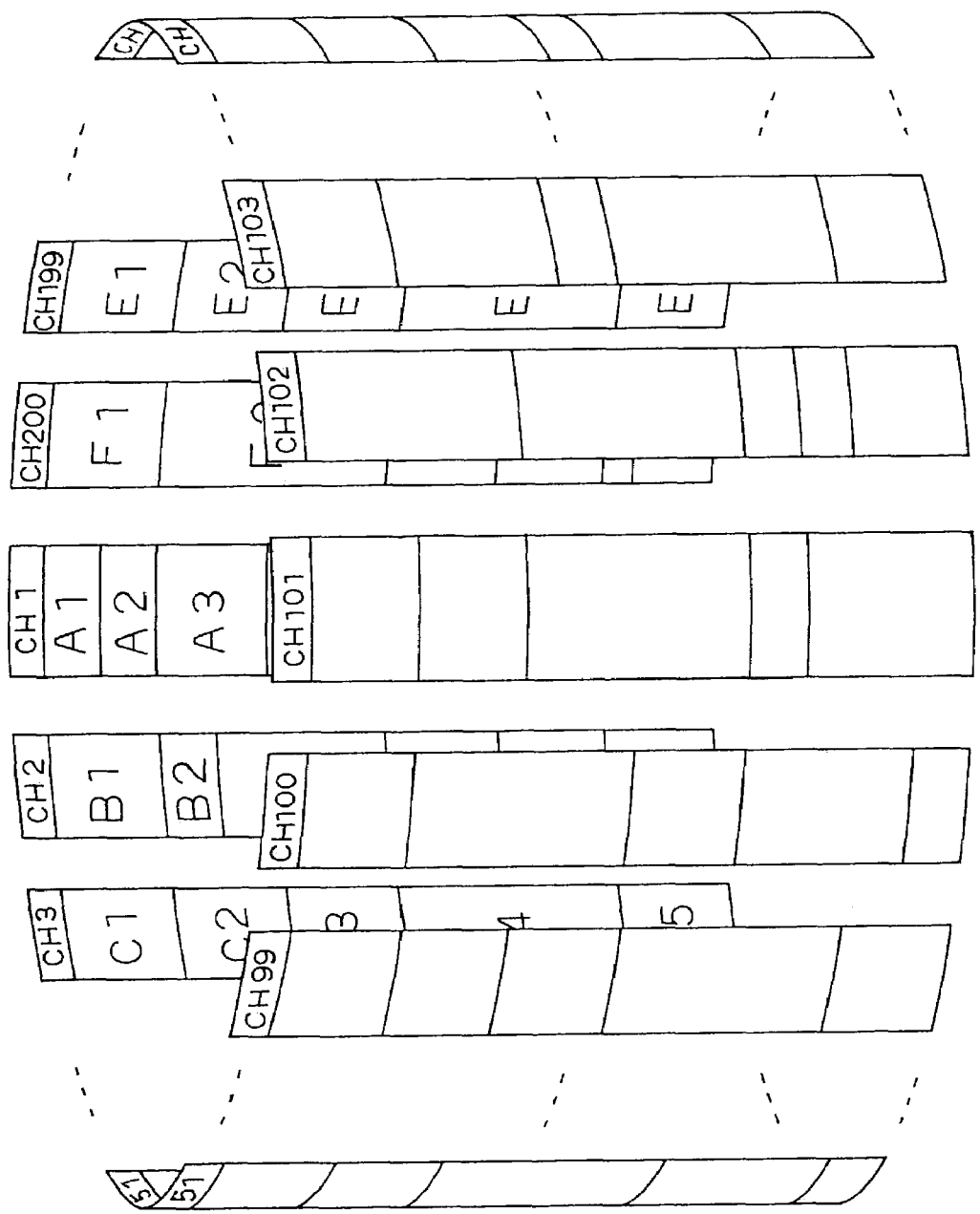
FIG. 11 is a view showing an example of EPG data displayed on the display 8 in accordance with Embodiment 1 of the present invention.

Hence, the control means 5 carries out display control so that the state where the EPG data stuck to the side face of the cylinder 9 can be seen when the center C of the cylinder 9 is viewed from the point δ of FIG. 9 is displayed on the display 8. By this control, the EPG data is displayed on the display 8 as shown in FIG. 11.

The point δ is a point on the plane P, positioned on a circumference having the line segment O"β (or the line segment O"γ) as a radius, wherein the angle formed between the line segment O"δ and the line segment O"β becomes 180 degrees.

Furthermore, in this case, the display mode change accepting means 7 corresponds to an example of the replacement display instruction accepting means of the EPG display apparatus of the present invention.

Figure 12:
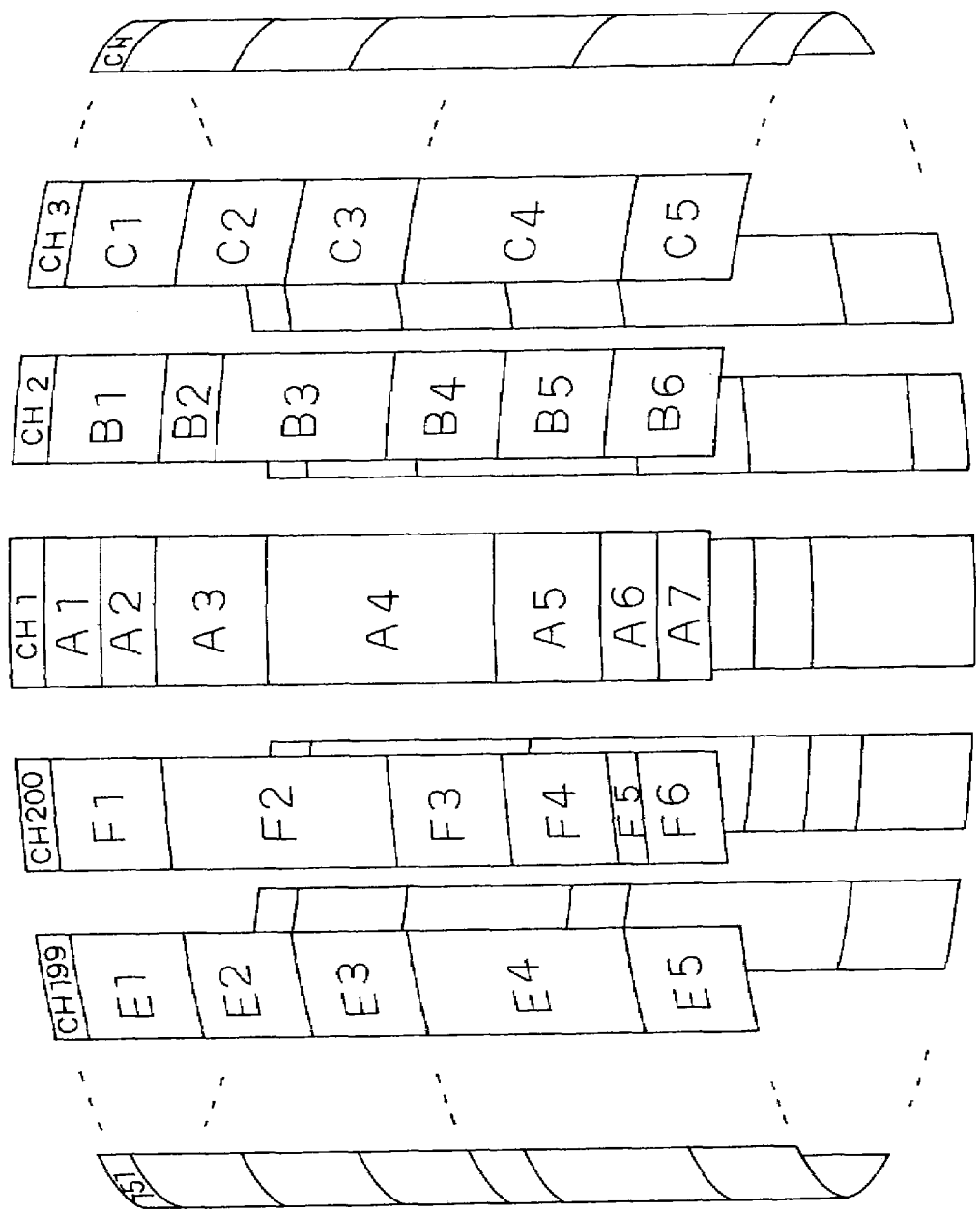
FIG. 12 is a view showing an example of EPG data displayed on the display 8 in accordance with Embodiment 1 of the present invention.

In the above-mentioned Embodiment 1, an example was described in which the state wherein the EPG data stuck to the side face of the cylinder 9 was seen when the center C of the cylinder 9 was viewed from a point outside the cylinder 9 on the positive side of the z-axis of the x-y-z space as shown in FIG. 4, FIG. 5 and FIG. 9 was displayed on the display 8. However, without being limited to this, a state obtained when the center C of the cylinder 9 is viewed from a point outside the cylinder 9 on the negative side of the z-axis of the x-y-z space may be displayed on the display 8. In this case, EPG data is displayed on the display 8 as shown in FIG. 12, for example.

In addition, in the above-mentioned Embodiment 1, for convenience in explanation, it was explained that the mapping means 3 mapped the two-dimensional EPG data stored in the first storage means 2 and shown in FIG. 2 on the side face of the cylinder 9 as shown in FIG. 3. However, without being limited by this, the mapping means 3 may map the EPG data on the side face of a polygonal prism.

The EPG data of each channel may be mapped on each side face of a prism having a base face of a regular polygon having 200 angles, for example.

Figure 13B:
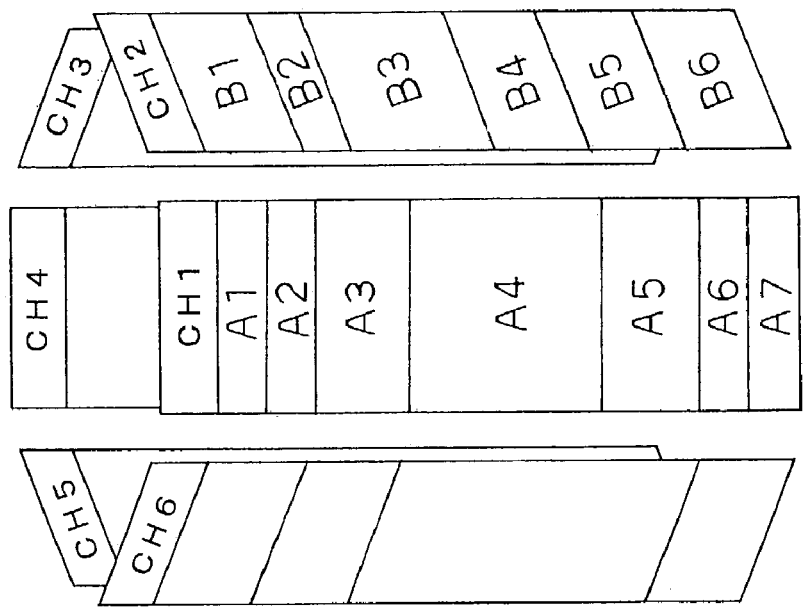
FIG. 13(b) is an explanatory view in the case when two-dimensional EPG data is mapped on each side face of a polygonal prism in accordance with Embodiment 1 of the present invention.
Figure 13A:
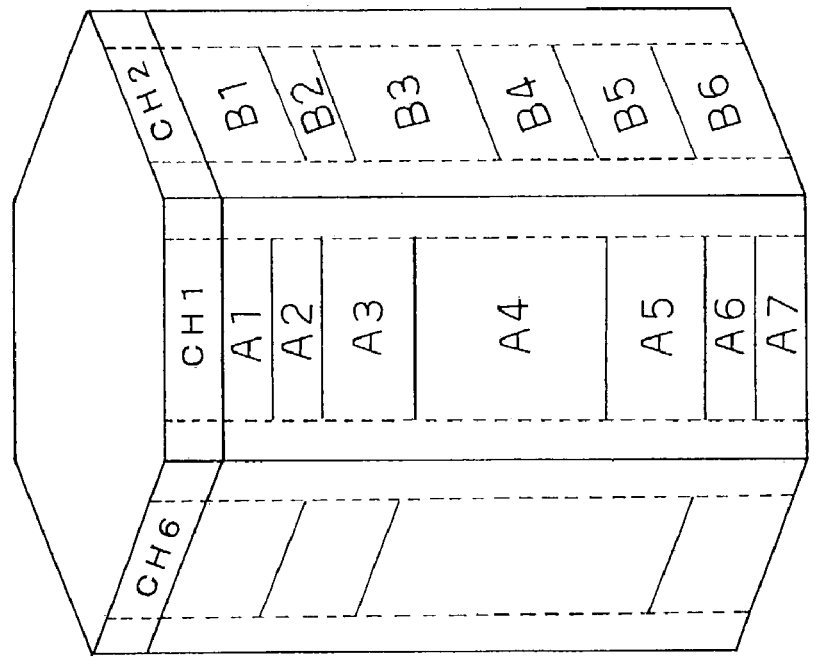
FIG. 13(a) is an explanatory view in the case when two-dimensional EPG data is mapped on each side face of a polygonal prism in accordance with Embodiment 1 of the present invention.
Figure 14:
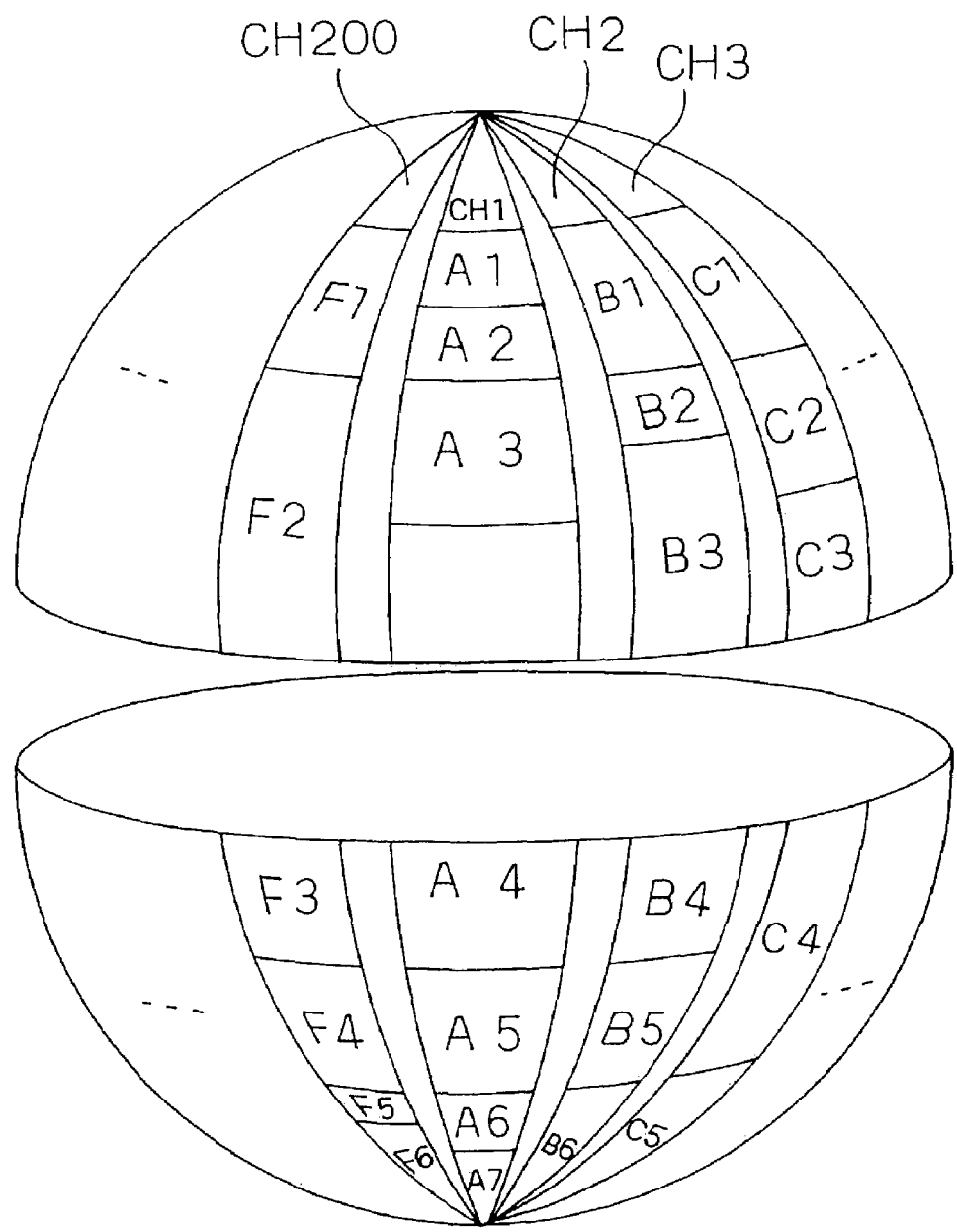
FIG. 14 is an explanatory view in the case when two-dimensional EPG data is mapped on the surface of a sphere in accordance with Embodiment 1 of the present invention.

FIG. 13(*a*) shows a state wherein EPG data of six channels is mapped on the side faces of a prism having a base face of a regular hexagon as an example of the state wherein EPG data is mapped on the side face of a polygon. In this case, the second storage means 4 stores three-dimensional EPG data having a state wherein EPG data is mapped on each side face of the prism; by the control of the control means 5, the EPG data is displayed on the display 8 as shown in FIG. 13(*b*) as if the EPG data is stuck to each side face of the prism, without providing any sense of strangeness for humans.

Furthermore, in the above-mentioned Embodiment 1, it was explained that the mapping means 3 mapped the two-dimensional EPG data on the side face of the cylinder 9 as shown in FIG. 3; however, the mapping means 3 may map the two-dimensional EPG data on the surface of a sphere as shown in FIG. 4.

In this case, the second storage means 4 stores three-dimensional EPG data having a state wherein the two-dimensional EPG data is mapped on the surface of the sphere; by the control of the control means 5, the EPG data is displayed on the display 8 as if the EPG data is stuck to the surface of the sphere, without providing any sense of strangeness for humans.

Moreover, in the above-mentioned Embodiment 1, it was explained that the display accepting means 6 accepts an instruction for displaying EPG data on the display 8 from the user; however, by preparing a remote control unit that can remote-control the EPG display apparatus 1 from outside, the user may input the above-mentioned instruction to the display accepting means 6 by using the remote control unit.

In a similar way, in the above-mentioned Embodiment 1, when the user desires to display the three-dimensional EPG data stored in the second storage means 4 on the display 8 with the EPG data of the 51th channel placed at the center for example, the user may input the desire to the display mode change accepting means 7 by using the above-mentioned remote control unit.

In addition, in the above-mentioned Embodiment 1, as explained by using FIG. 8, it was explained that the control means 5 reversed the EPG data stuck to the rear face 12 of the cylinder 9 and displayed the data on the display 8. However, without being limited by this, it may be possible that the EPG data stuck to the rear face 12 of the cylinder 9 is reversed and stored in the second storage means 4 and that the control means 5 displays the EPG data stored in the second storage means 4 as shown in FIG. 8(*b*), for example.

Furthermore, in the above-mentioned Embodiment 1, it was explained that when the second storage means 4 stored one piece of the EPG data mapped on the side face of the cylinder 9 and the predetermined instruction was input to the display mode change accepting means 7, the control means 5 calculated the state of the EPG data that was able to be seen when the line of sight was placed at each of the point β, the point γ and the point δ, as explained by using FIG. 9, and displayed the state as the EPG.

However, it may be possible that when the line of sight was placed at each of the point β, the point γ and the point δ the second storage means 4 stores the state of the EPG data that can be seen from each point in correspondence with each point, and the control means 5 selects data corresponding to an instruction input to the display mode change accepting means 7 from among the data stored in the second storage means 4 and displays the data on the display 8.

Figure 15:
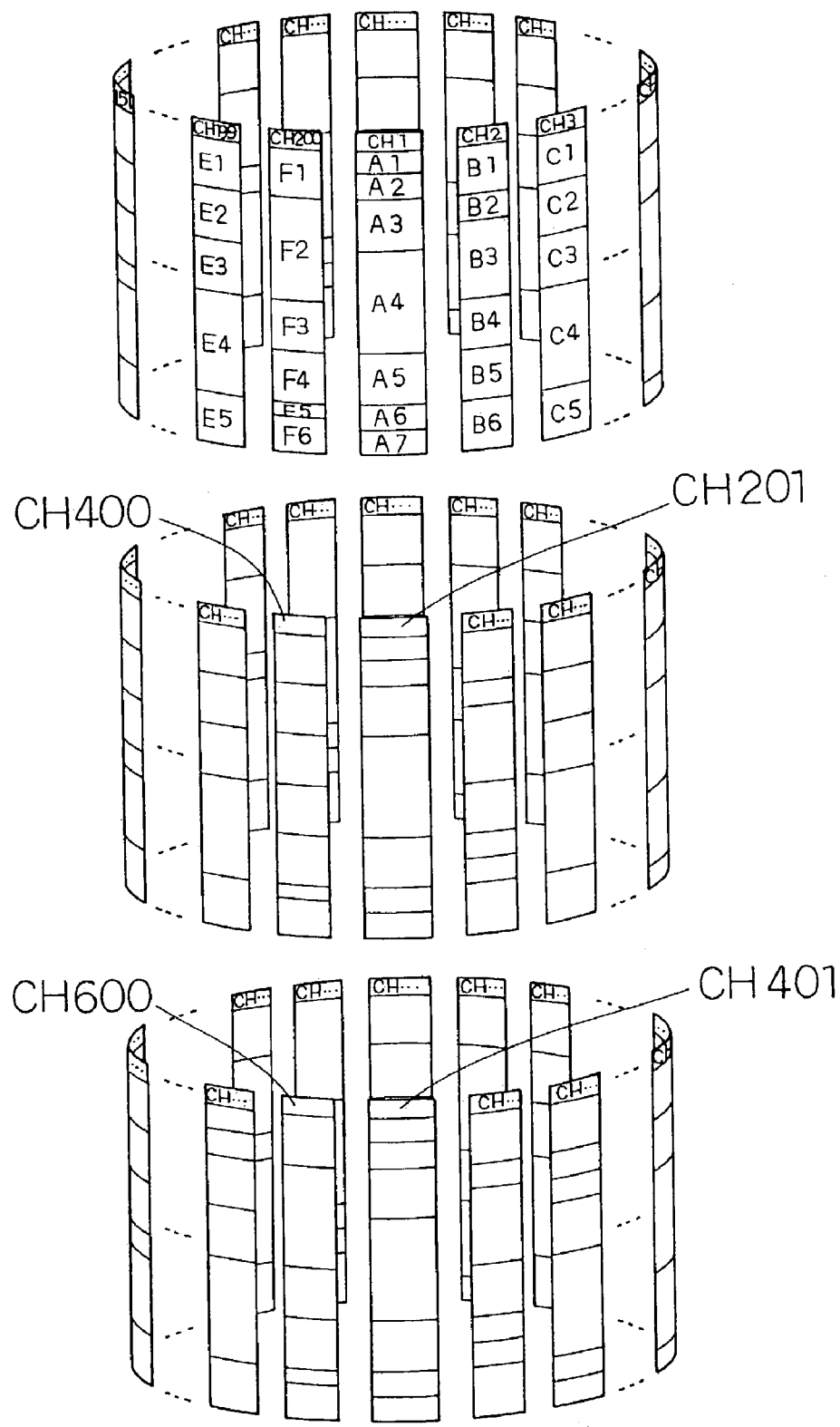
FIG. 15 is a view showing an example when a plurality of EPG data are displayed on the display 8 in accordance with Embodiment 1 of the present invention.

Still further, in the above-mentioned Embodiment 1, for convenience in explanation, EPG data of 200 channels was handled; however, for example, when handling a plurality of groups of EPG data wherein EPG data of 200 channels is taken as one group, the plurality of groups of EPG data may be displayed so that objects to which the groups of the EPG data are stuck are overlaid. For example, when handling a first group of EPG data of the first channel to 200th channel, a second group of EPG data of the 201th channel to 400th channel and a third group of EPG data of the 401th channel to 600th channel, the data may be displayed so that three cylinders are overlaid as shown in FIG. 15.

Embodiment 2

Figure 16:
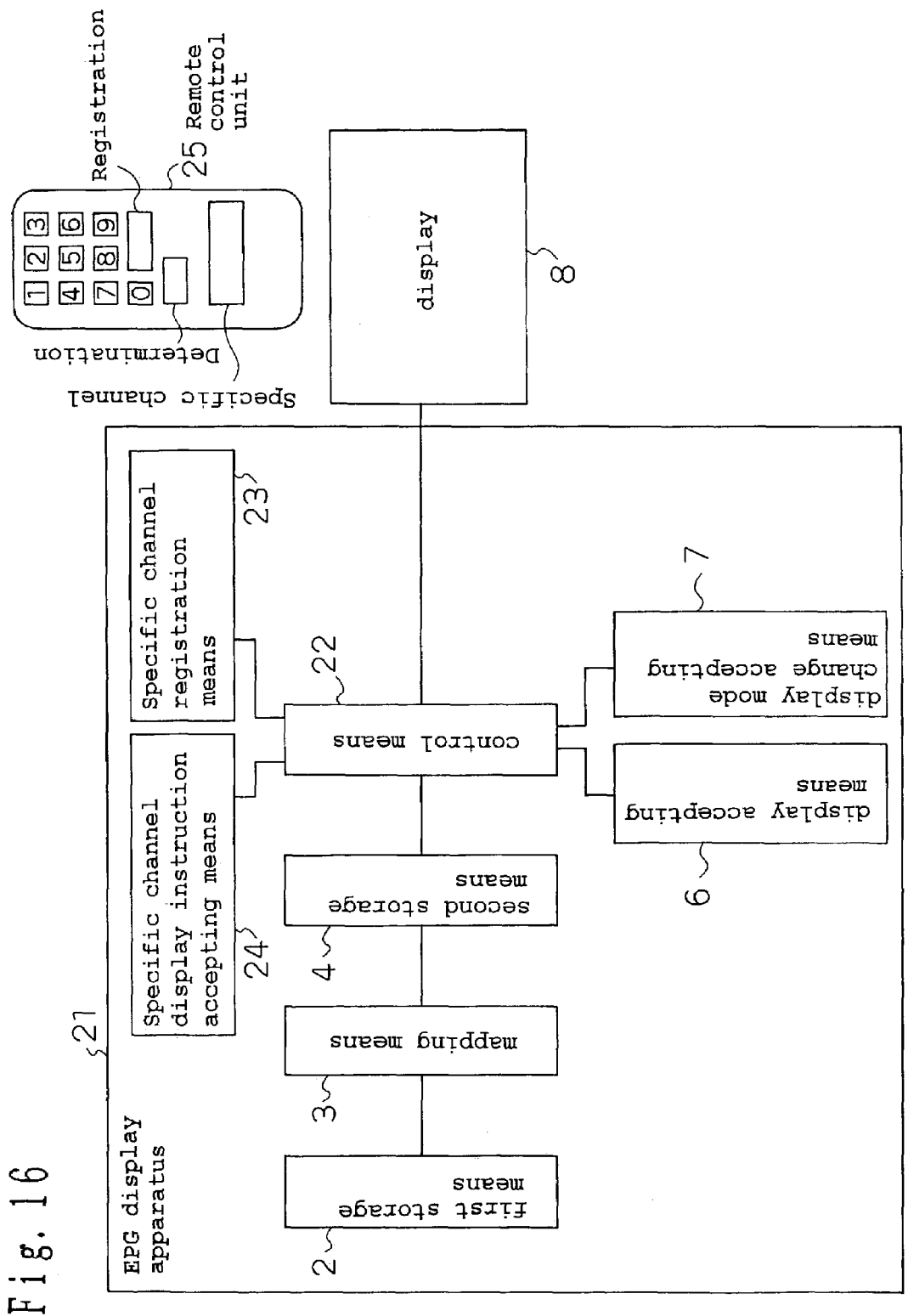
FIG. 16 is a view showing the configuration of an EPG display apparatus in accordance with Embodiment 2 of the present invention.

Next, the configuration of an EPG display apparatus in accordance with Embodiment 2 will be described together with its operation. FIG. 16 shows the configuration of an EPG display apparatus 21 in accordance with Embodiment 2. As shown in FIG. 16, the EPG display apparatus 21 in accordance with Embodiment 2 is obtained by adding a specific channel registration means 23 of accepting registration for displaying the EPG data of a specific channel and a specific channel display instruction accepting means 24 of accepting an instruction for displaying the EPG data of the specific channel registered in the specific channel registration means 23 to the respective means of the EPG display apparatus 1 in accordance with Embodiment 1.

In addition, a remote control unit 25 capable of remote-controlling the EPG display apparatus 21 from outside is also shown. Furthermore, different from the control means 5 in accordance with Embodiment 1, a control means 22 in accordance with Embodiment 2 displays EPG data on the basis of an instruction accepted by the specific channel display instruction accepting means 24.

As described above, since the EPG display apparatus 21 in accordance with Embodiment 2 and the EPG display apparatus 1 in accordance with Embodiment 1 are mostly common to each other, only the sections different from those of Embodiment 1 will be described in the explanation of Embodiment 2.

When the user desires to display the EPG data of a specific channel, the user registers the specific channel in the specific channel registration means 23 by using the remote control unit 25.

For convenience in explanation, it is herein assumed that the user desires to display the EPG data of ten channels, that is, the first channel, second channel, fifth channel, 20th channel, 35th channel, 87th channel, 105th channel, 133th channel, 160th channel and 199th channel. The user then registers the ten channels in the specific channel registration means 23 by using the remote control unit 25.

A case wherein the 35th channel is registered for example is explained; the user presses the "registration" button of the remote control unit 25, then presses the "3" and "5" buttons in this sequence, and presses the "determination" button in the end, whereby the 35th channel is registered.

Next, when the user actually displays the EPG data of the registered channel, the user inputs an instruction for the purpose in the specific channel display instruction accepting means 24 by using the remote control unit 25.

For example, when the "specific channel" button of the remote control unit 25 is pressed, it may be possible that an instruction for actually displaying the EPG data of a registered channel is accepted by the specific channel display instruction accepting means 24.

Figure 17:
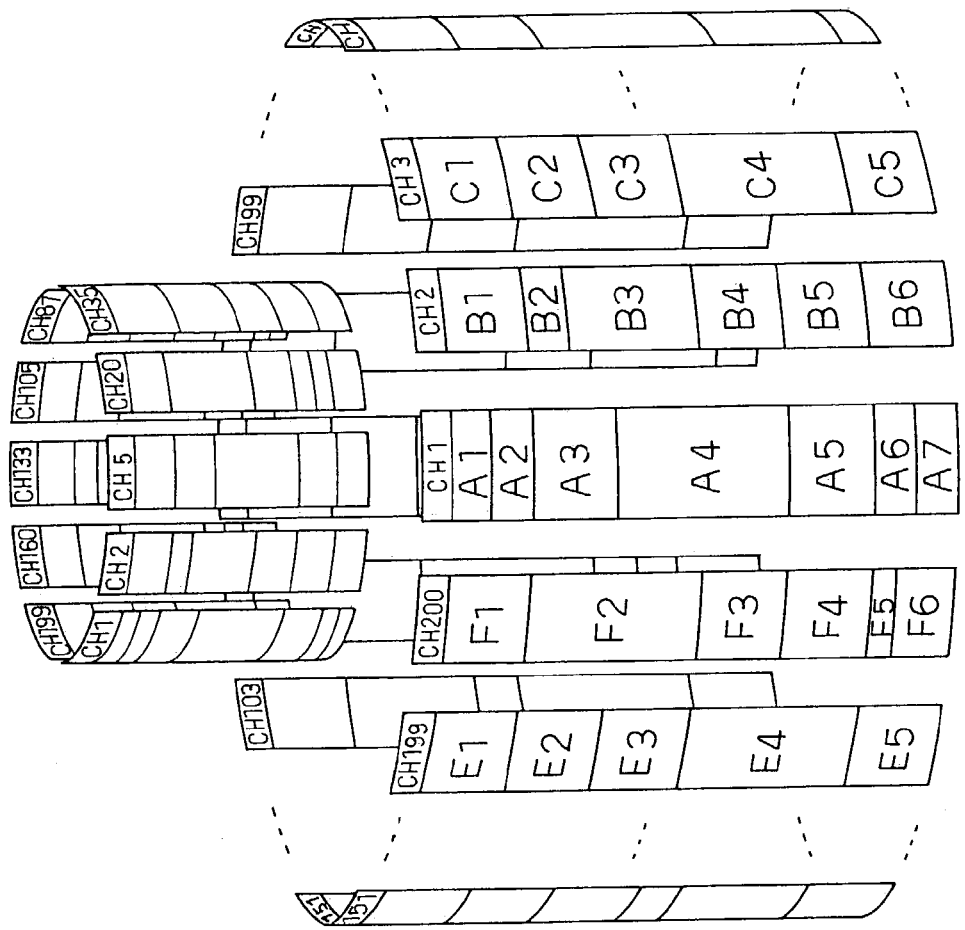
FIG. 17 is a view showing an example of EPG data displayed on the display 8 in accordance with Embodiment 2 of the present invention.

The control means 22 thus displays the EPG data of the specific channel together with the EPG data of all channels as shown in FIG. 17 on the display 8 on the basis of the instruction accepted by the specific channel display instruction accepting means 24.

As the EPG data of 200 channels shown in FIG. 6 is displayed on the display 8, the EPG data of the specific channel is also displayed as if the data is stuck to the side face of the cylinder, without providing any sense of strangeness for humans.

Figure 18:
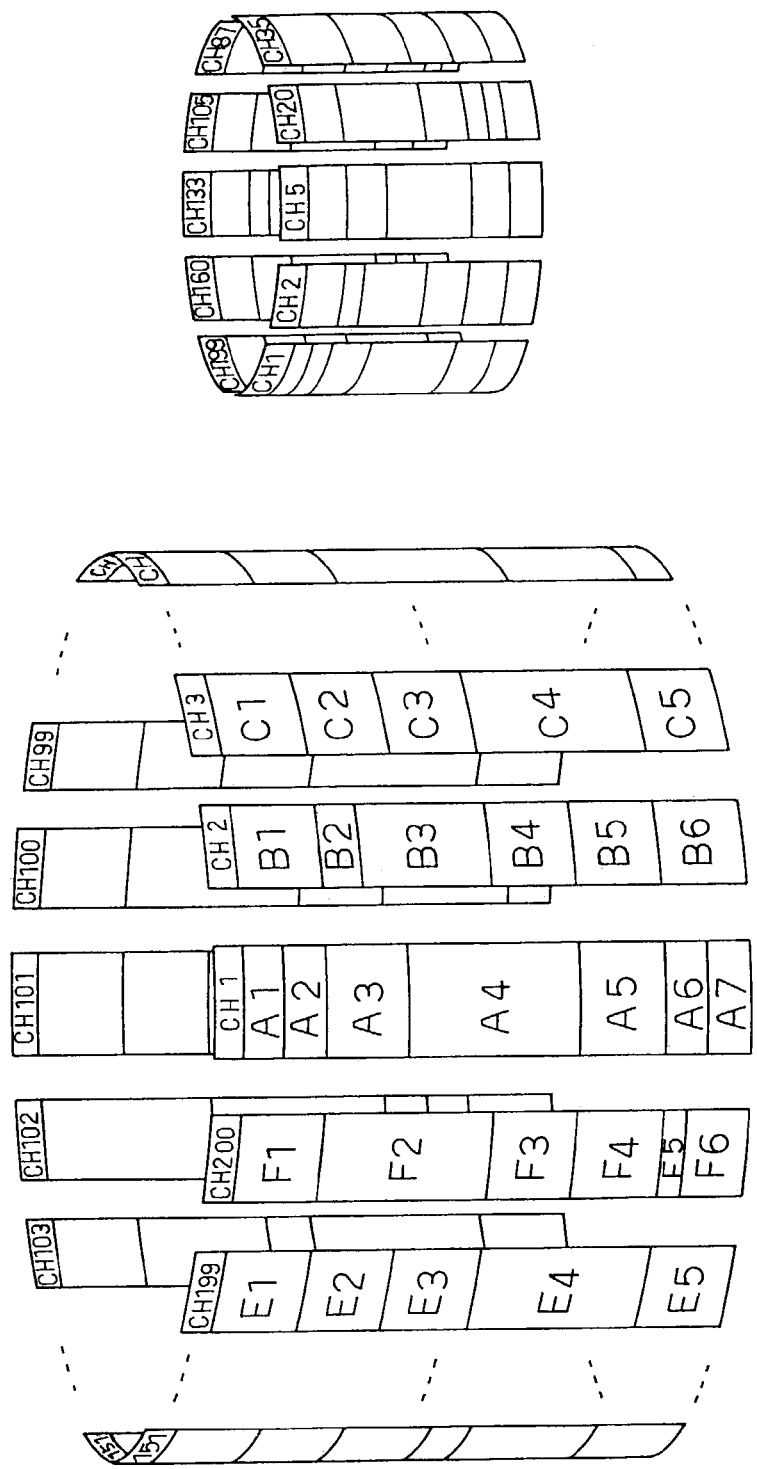
FIG. 18 is a view showing an example of EPG data displayed on the display 8 in accordance with Embodiment 2 of the present invention.

In the above-mentioned Embodiment 2, it was explained that the EPG data of the specific channel was displayed above the EPG data of all channels as shown in FIG. 17; however, the control means 22 may display the EPG data of all channels and the EPG data of the specific channel side by side as shown in FIG. 18.

Furthermore, the control means 22 may display only the EPG data of the specific channel. In this case, it may be possible that the second storage means 4 stores the EPG data of all channels and that the control means 22 selects only the EPG data of the specific channel to display only the selected EPG data; or it may be possible that the second storage means 4 stores only the EPG data of the specific channel and that the control means 22 displays the stored EPG data.

Embodiment 3

Figure 19:
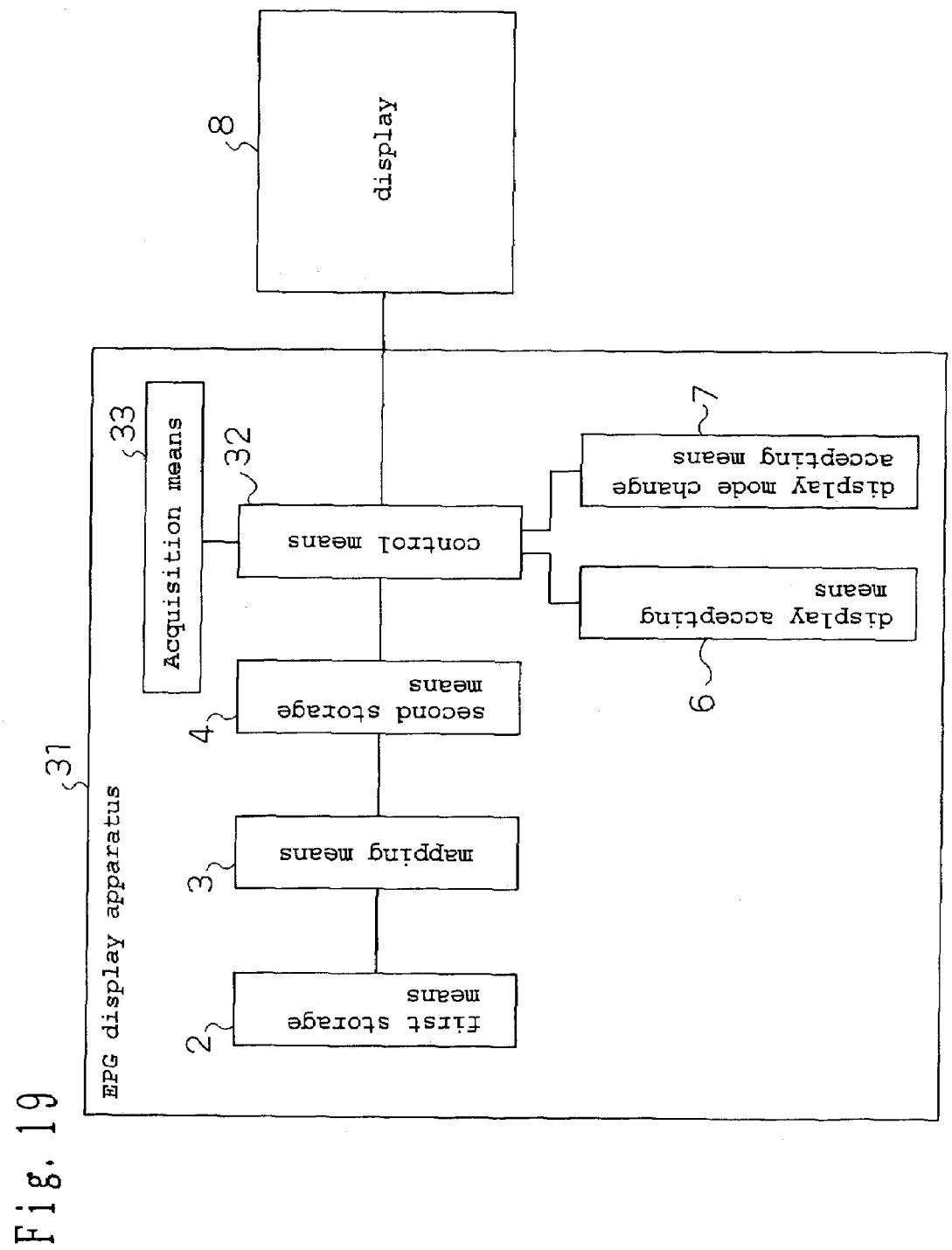
FIG. 19 is a view showing the configuration of an EPG display apparatus in accordance with Embodiment 3 of the present invention.

Next, the configuration of an EPG display apparatus in accordance with Embodiment 3 will be described together with its operation. FIG. 19 shows the configuration of an EPG display apparatus 31 in accordance with Embodiment 3.

As shown in FIG. 19, the EPG display apparatus 31 in accordance with Embodiment 3 is obtained by adding an acquisition means 33 of acquiring information on programs scheduled to be recorded or watched to the respective means of the EPG display apparatus 1 in accordance with Embodiment 1.

Moreover, unlike the control means 5 in accordance with Embodiment 1, the control means 32 in accordance with Embodiment 3 is used to display only the EPG data of programs regarding information acquired by the acquisition means 33. In other words, the control means 32 is used to display only the EPG data of programs scheduled to be recorded or watched.

Since the EPG display apparatus 31 in accordance with Embodiment 3 and the EPG display apparatus 1 in accordance with Embodiment 1 are mostly common to each other, only the sections different from those of Embodiment 1 will be described in the explanation of Embodiment 3.

Figure 20:
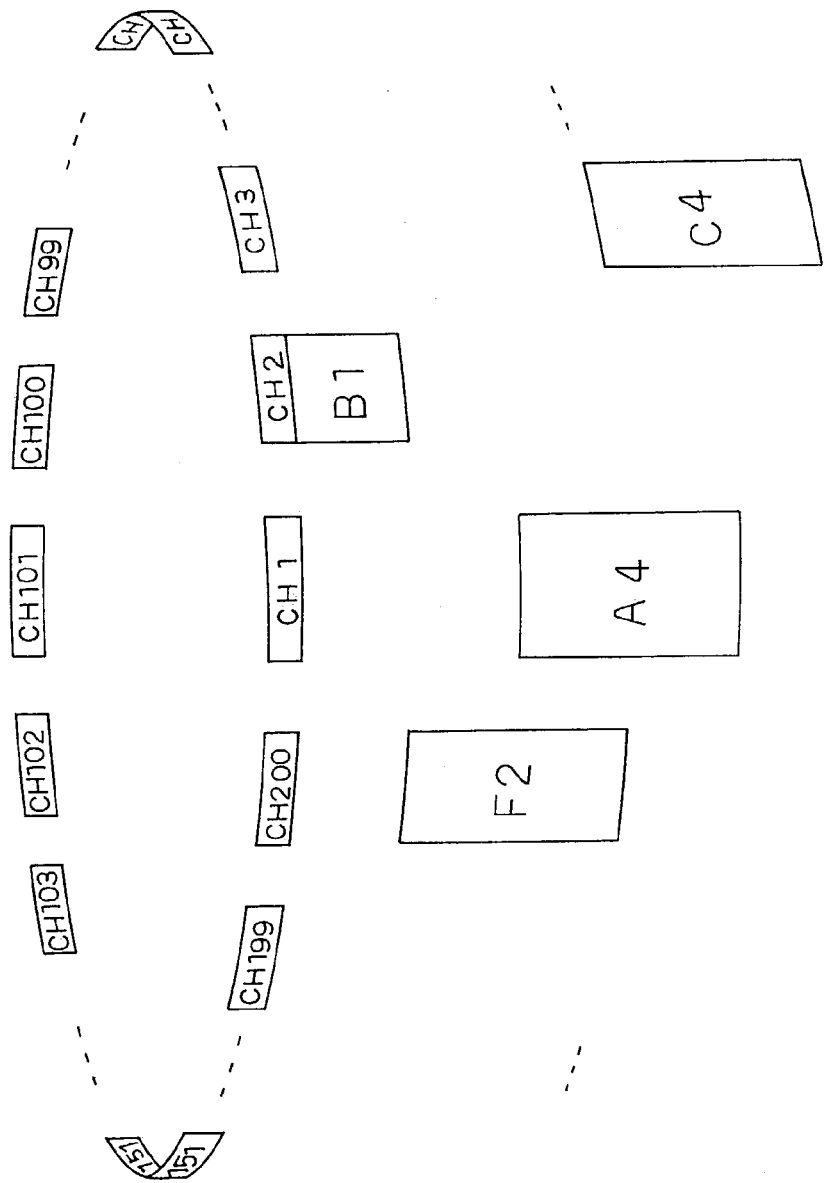
FIG. 20 is a view showing an example of EPG data displayed on the display 8 in accordance with Embodiment 3 of the present invention.

In Embodiment 3, for convenience in explanation, it is assumed that programs scheduled to be recorded or watched are "A4," "B1," "C4" and "F2" of FIG. 2. In this situation, when the display accepting means 6 accepts an instruction for displaying EPG data on the display 8 from the user, the control means 32 displays only the EPG data of the above-mentioned programs "A4," "B1," "C4" and "F2" as shown in FIG. 20, instead of displaying all the EPG data.

In this case, it may be possible that the second storage means 4 stores all the EPG data of all channels and that the control means 32 selects the EPG data of only the programs scheduled to be recorded or watched to display only the selected EPG data; or it may be possible that the second storage means 4 stores the EPG data of only the programs scheduled to be recorded or watched and that the control means 32 may display the stored EPG data.

When the second storage means 4 stores the EPG data of only the programs scheduled to be recorded or watched, it is assumed that the second storage means 4 stores information on positions at which the EPG data of the programs scheduled to be recorded or watched is stuck to the side face of the cylinder 9.

In addition, in the above-mentioned Embodiment 3, only the programs scheduled to be recorded or watched were referred to for convenience in explanation; however, EPG data of recorded programs may also be displayed, just like the above-mentioned programs scheduled to be recorded or watched.

Furthermore, the present invention is a program that carries out the functions of all or part of the means (or apparatuses, devices, circuits, portions, etc.) of the above-mentioned EPG display apparatus of the present invention by using a computer and operates in cooperation with the computer.

Still further, the present invention is a program that carries out the operations of all or part of the steps (or processes, operations, actions, etc.) of the above-mentioned EPG display method of the present invention by using a computer and operates in cooperation with the computer.

Still further, the present invention is a medium that holds a program for carrying out all or part of the functions of all or part of the means of the above-mentioned EPG display apparatus of the present invention, and the medium that can be read by a computer, wherein the above-mentioned program having been read carries out the above-mentioned functions in cooperation with the computer.

Still further, the present invention is a medium that holds a program for carrying out all or part of the operations of all or part of the steps of the above-mentioned EPG display method of the present invention, the medium can be read by a computer, and the above-mentioned program having been read carries out the above-mentioned operations in cooperation with the computer.

Part of the means (or apparatuses, devices, circuits, portions, etc.) of the present invention and part of the steps (or processes, operations, actions, etc.) of the present invention designate some means or steps in the plural means or steps, or part of functions or part of actions in one means or step.

Furthermore, a utilization form of the program of the present invention may be an embodiment that is recorded on a recording medium readable by a computer and operates in cooperation with the computer.

Still further, a utilization form of the program of the present invention may be an embodiment that is transmitted through a transmission medium and read by a computer and operates in cooperation with the computer.

Still further, the data structure of the present invention includes a database, a data format, a data table, a data list, a data type, etc.

Still further, the recording medium includes ROM, etc., and the transmission medium includes a transmission medium, such as the Internet, light, electric wave, sound wave, etc.

Still further, the above-mentioned computer of the present invention is not limited to pure hardware, such as a CPU, but may include firmware, an OS and peripheral devices.

Still further, as described above, the configuration of the present invention may be attained by software or by hardware.

In the above-mentioned embodiments, the case wherein clearance regions were included without fail in the two-dimensional EPG data was explained; however, without being limited to this, the above-mentioned clearance regions are not always necessary only if the reversing described by using FIG. 8(*a*) and FIG. 8(*b*) is carried out. Even in this case, as shown in FIG. 7, there brings an effect wherein the EPG data displayed on the outer circumferential face 12 on the rear side can be seen from the inner circumferential face side 100 of the transparent cylinder 9 without providing any sense of strangeness is delivered. Furthermore, the above-mentioned cylinder should only be substantially transparent and is not required to be completely transparent, provided that the EPG data can be visually recognized.

Still further, in the above-mentioned embodiments, the case wherein the EPG data was virtually stuck to the outer circumferential wall face of an object in a three-dimensional space was explained; however, without being limited to this, it is possible to have a configuration for carrying out display on the inner circumferential wall face when the display is carried out on the rear side of the above-mentioned object. In this case, the wall face on the rear side of the above-mentioned object is not required to be transparent.

Still further, in the above-mentioned case, when the thickness of the outer circumferential wall face in the three-dimensional space is not zero, the displayable area in the case when display is carried out on the outer circumferential wall face differs from that in the case when display is carried out on the inner circumferential wall face. Generally, in the case when display is carried out on the inner circumferential wall face, the area becomes smaller; hence, it is necessary to downsize the contour shape of the mapped data so as to be aligned with the shape of the display region thereof.

Still further, in the above-mentioned embodiments, in the EPG data of the specific channels positioned on both the right and left ends viewed from the user, part of the display data of the same channel is disposed on the front side and the rest is disposed on the rear side in some cases; this is shown in FIG. 6 and the like. Hence, the above-mentioned reversing has been carried out so that even the display data on the rear side can be seen from the user without providing any sense of strangeness. However, without being limited to this, a configuration not subjected to the above-mentioned reversing may be used even in this case, for example. In this case, part of the display of the EPG data of each of specific channels disposed on both ends is seen in a state viewed from the rear side; however, this display is easier to see in comparison with the conventional example as a whole, even in the case of multiple channels.

With the above-mentioned configuration, it is possible to display EPG data so that EPG data of multiple channels can be seen by humans in a natural state.

INDUSTRIAL APPLICABILITY

As clearly described above, the present invention has an advantage in display where EPG data can be easier to see in comparison with the conventional example, even when the number of channels increases.

The invention claimed is:

1. An EPG display apparatus comprising:
   storage means of storing three-dimensional EPG data obtained by mapping all or part of two-dimensional EPG data on a surface of a cylinder-like shape in a virtual three-dimensional space, and
   control means of displaying all or part of said three-dimensional EPG data stored in said storage means on a display screen, wherein
   when said control means displays said three-dimensional EPG data on said display screen, said control means (i) reverses three-dimensional EPG data which are mapped on a rear face of said cylinder-like shape and (ii) disposes at least a portion of said three-dimensional EPG data on at least one of a right-hand side and a left-hand side of said cylinder-like shape, except that for the three-dimensional EPG data of each channel data disposed on the right-hand side and left-hand side of said cylinder-like shape, a part of said EPG data of said each channel data is displayed at a position corresponding to a front face of said cylinder-like shape and a rest of said EPG data of said each channel data is displayed at a position corresponding to said rear face.

2. An EPG display apparatus in accordance with claim 1, wherein
   said EPG data includes a plurality of columns of data, each column corresponding to a respective channel, and
   clearance regions provided between immediately adjacent columns of the plurality of columns of data are included beforehand in said EPG data to be displayed at least at the position corresponding to said front face so that at least part of said EPG data to be displayed at a position corresponding to said rear face is visually recognizable.

3. An EPG display apparatus in accordance with any one of claims 1 and 2, further comprising:
   replacement display instruction accepting means of accepting an instruction for replacing a display position of said EPG data to be displayed on the front face of said object with a display position of said EPG data to be displayed on the rear face of said object and displaying said data, wherein
   said control means replaces the display position of said EPG data to be displayed on the front face of said object with the display position of said EPG data to be displayed on the rear face of said object and displays said data on the basis of said instruction accepted by said replacement display instruction accepting means.

4. An EPG display apparatus in accordance with any one of claims 1 and 2, further comprising:
   specific channel registration means of accepting registration for displaying the EPG data of only specific channels, and
   specific channel display instruction accepting means of accepting an instruction for displaying the EPG data of only said specific channels registered in said specific channel registration means, wherein
   the EPG data of only said specific channels corresponds to part of said two-dimensional EPG data.

5. An EPG display apparatus in accordance with claim 4, wherein
   said control means displays a second cylinder-like shape at a position which is an upper part or a lower part of said cylinder-like shape so that front surfaces of said cylinder-like shape and said second cylinder-like shape are not overlapping each other, and
   all or part of the EPG data of only said specific channels is disposed by mapping on said surface of said second cylinder-like shape and then displayed by said control means.

6. An EPG display apparatus in accordance with any one of claims 1 and 2, further comprising:
   acquisition means of acquiring information on recorded programs, information on programs scheduled to be recorded or information on programs scheduled to be watched, wherein
   when said control means displays said three-dimensional EPG data on said display screen, said control means displays only the EPG data of programs regarding said information acquired by said acquisition means.

7. An EPG display method comprising:
   a storage step of storing three-dimensional EPG data obtained by mapping all or part of two-dimensional EPG data on a surface of a cylinder-like shape in a virtual three-dimensional space,
   a control step of displaying all or part of said three-dimensional EPG data stored at said storage step on a display screen, and
   a step of disposing at least a portion of said three-dimensional EPG data on at least one of a right-hand side and a left-hand side of said cylinder-like shape, wherein
   when said three-dimensional EPG data is displayed on said display screen in said control step, three-dimensional EPG data which are mapped on a rear face of said cylinder-like shape is reversed except that the three-dimensional EPG data of each channel data disposed on the right-hand side and the left-hand side of said cylinder-like shape so that a part of said EPG data of said each channel data is displayed at a position corresponding to a front face of said cylinder-like shape and a rest of said EPG data of said each channel data is displayed at a position corresponding to said rear face.

8. A tangible computer readable recording medium holding a program of causing a computer to function said storage means and said control means of said EPG display apparatus in accordance with any one of claims 1 and 2.

9. A tangible computer readable recording medium holding a program of causing a computer to carry out said storage step and said control step of said EPG display method in accordance with claim 7.

* * * * *